(12) United States Patent
Maurer et al.

(10) Patent No.: US 12,602,599 B2
(45) Date of Patent: Apr. 14, 2026

(54) RANKING AND MARKING MESSAGES IN A GROUP-BASED COMMUNICATION SYSTEM USING MACHINE LEARNING TECHNIQUES

(71) Applicant: Salesforce, Inc., San Francisco, CA (US)

(72) Inventors: Aaron Maurer, Washington D.C., DC (US); Fiona Condon, Brooklyn, NY (US); Kyle Jablon, Long Island City, NY (US); Shaurya Kethireddy, Madison, WI (US)

(73) Assignee: Salesforce, Inc., San Francisco, CA (US)

( * ) Notice: Subject to any disclaimer, the term of this patent is extended or adjusted under 35 U.S.C. 154(b) by 696 days.

(21) Appl. No.: 18/161,648

(22) Filed: Jan. 30, 2023

(65) Prior Publication Data

US 2024/0256918 A1     Aug. 1, 2024

(51) Int. Cl.
  *G06F 15/16*     (2006.01)
  *G06N 5/022*     (2023.01)
(52) U.S. Cl.
  CPC .................................... *G06N 5/022* (2013.01)
(58) Field of Classification Search
  CPC ...................................................... G06N 5/022
  USPC ............................................................ 709/206
  See application file for complete search history.

(56) References Cited

U.S. PATENT DOCUMENTS 10,462,622 B2 * 10/2019 Yan ........................ H04L 51/226
10,860,629 B1 * 12/2020 Gangadharaiah .... G06N 3/0442

11,070,497 B2 *  7/2021 Bradley .................. G06F 40/30
11,082,368 B2 *  8/2021 Chung .................... G06N 3/006
11,196,689 B2 * 12/2021 White ................... H04L 51/214
11,238,076 B2 *  2/2022 Roitman ............... H04L 51/046
11,277,361 B2 *  3/2022 Mann .................. G06F 11/3409
11,446,570 B2 *  9/2022 Borovikov ............ G06N 20/00
11,470,293 B2 * 10/2022 Park ...................... G01J 3/0272
11,792,141 B2 * 10/2023 El Ghazzal ........... H04L 51/216
                                                        709/206
11,955,117 B2 *  4/2024 McDermid ......... G10L 15/1822
            (Continued)

OTHER PUBLICATIONS

"Die, Email, Die! A Flickr Cofounder Aims To Cut US All Some Slack", Readwriteweb, Lexisnexis, https://advance.lexis.com/api/permalink/33dd79e2-9015-409d-ae27-5a2c7e86bf31/?context=1000516>. (dated Aug. 14, 2013, 4:15 PM) 2 pages.
            (Continued)

*Primary Examiner* — Moustafa M Meky
(74) *Attorney, Agent, or Firm* — Holland & Hart, LLP.

(57)            ABSTRACT

Methods, systems, apparatuses, devices, and computer program products are described. In a group-based communication system, a user may save posts for later (e.g., to reply to a message at a later time, to complete a task associated with a message at a later time). The system may use a machine learning model to determine to automatically mark a post for later for a user, for example, based on a set of features including at least a semantic embedding of the post. Additionally, or alternatively, the system may use a machine learning model to determine an order for displaying items (e.g., posts, reminders, files) within a user view (e.g., a later tab, a drafts tab, a threads tab, a files tab) for a user via a user interface. The system may update one or more machine learning models based on how users interact with the posts, user views, or both.

20 Claims, 12 Drawing Sheets

(56)　　　　　References Cited

U.S. PATENT DOCUMENTS

| | | | | |
|---|---|---|---|---|
| 12,076,635 | B2 * | 9/2024 | Collins | A63C 19/12 |
| 12,301,520 | B2 * | 5/2025 | Bradley | G06F 40/30 |
| 2018/0176173 | A1 * | 6/2018 | Keysers | G06N 7/01 |
| 2018/0287982 | A1 | 10/2018 | Draeger et al. | |
| 2019/0208372 | A1 * | 7/2019 | Yan | H04W 4/21 |
| 2019/0297040 | A1 * | 9/2019 | White | H04L 51/08 |
| 2021/0044547 | A1 * | 2/2021 | Bradley | G06F 40/30 |
| 2021/0326369 | A1 * | 10/2021 | Roitman | G06F 16/353 |
| 2021/0346798 | A1 * | 11/2021 | Borovikov | A63F 13/352 |
| 2022/0086409 | A1 * | 3/2022 | Park | G01J 3/524 |
| 2022/0224659 | A1 * | 7/2022 | El Ghazzal | H04L 51/216 |
| 2022/0383865 | A1 * | 12/2022 | McDermid | G06F 40/30 |
| 2023/0009378 | A1 * | 1/2023 | Borovikov | G06F 11/3684 |
| 2023/0188636 | A1 * | 6/2023 | Kratz | H04M 1/72436 |
| | | | | 455/412.1 |
| 2024/0031311 | A1 * | 1/2024 | Bradley | G06F 40/30 |
| 2024/0203405 | A1 * | 6/2024 | McDermid | G06F 40/30 |
| 2025/0032909 | A1 * | 1/2025 | Borovikov | G06N 20/00 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online] [retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014, 2:48 PM) 8 pages.

Emie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a819-4d7d-9573-89d9598a4963/?context=1000516> (dated Oct. 31, 2014) 2 pages.

Olkarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner 110-a 130-a 110-b 130-b 105-a 105-b 105-c

135

110-c 130-c

Data Center

120

140

Cloud
Platform

115

125

130-d 110-d

100

RANKING AND MARKING MESSAGES IN A GROUP-BASED COMMUNICATION SYSTEM USING MACHINE LEARNING TECHNIQUES

TECHNICAL FIELD

The present disclosure relates generally to communication systems and data processing, and more specifically to ranking and marking messages in a group-based communication system using machine learning techniques.

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems).

Users may communicate information using a communication platform (e.g., a group-based communication system, separate from or associated with the cloud platform). In some examples, the group-based communication system may support different groups or teams of users sharing content within specific channels. Posts within a channel of the group-based communication system may be displayed in sequential order. For example, the system may display the posts within the channel based on timestamps indicating when the posts were added to the channel, from an earliest timestamp to a most-recent timestamp. However, in some cases, a user may want to perform a task relating to a post (e.g., replying to a message, reacting to a message, completing a task described by a message, reading a file) at a later time (e.g., later than when the user first views the post). If the user is a member of multiple channels (e.g., tens of channels), the user may potentially miss or forget a post that the user should respond to later. Additionally, or alternatively, the user may fail to keep track of which posts to respond to across the multiple channels, potentially leading to missed deadlines, lost opportunities, or other negative consequences.

SUMMARY

The described techniques relate to improved methods, systems, devices, and apparatuses that support ranking and marking messages in a group-based communication system using machine learning techniques. In a group-based communication system, a user may save posts for later (e.g., to reply to a message at a later time, to complete a task associated with a message at a later time). The system may use a machine learning model to determine whether to automatically mark a post for later for a user, for example, based on a set of features including at least a semantic embedding of the post. The set of features may leverage aspects of the group-based communication system to improve the accuracy of predicting which posts (e.g., messages, files, links) to mark for later. For example, how users interact within a group-based communication channel may affect whether the machine learning model suggests marking a post for later. Additionally, or alternatively, the system may use a machine learning model to determine an order for displaying items (e.g., posts, reminders, files) within a user view (e.g., a later tab, a drafts tab, a threads tab, a files tab) for a user via a user interface. For example, the machine learning model may rank the items based on importance to a user, rather than simply by due dates or creation dates, to ensure the user initially sees the most important items displayed within the user interface for the specific user view.

One or more technical solutions described herein may solve one or more technical problems by providing an improved graphical user interface (GUI) with improved usability, functionality, and user experience, an improved set of features, improved messaging, or some combination thereof for users of a group-based communication system. For example, the described techniques may support improved message handling. The system may automatically mark messages for later for a user, improving an interaction rate for the user with specific types of messages. Additionally, the machine learning model trained to mark—or suggest marking—the messages for later may use features specific to a group-based communication system, such as concurrency data, channel interaction data, group-based data, or any combination thereof to improve the accuracy of the machine learning model. Accordingly, the techniques described herein may support machine learning models that are relatively more accurate and reliable than machine learning models associated with other types of systems (e.g., email applications, social media applications) that fail to account for the specific features of a group-based communication system. Additionally, or alternatively, the group-based communication system may automatically rank items within a user view to improve the user experience. The ranking may dynamically change (e.g., as due dates approach, as new items are added to the user view), improving an interaction rate and reducing latency associated with a user interacting with the most important items in a user view (e.g., where the model predicts the ranking of importance specific to the user). Using such techniques, the group-based communication system may provide different experiences to different users to support user-specific optimizations or improvements. For example, the same message may be marked for later for one user but not another based on the output of a machine learning model. Similarly, the same user view may display items in a different order for different users based on the output of another machine learning model.

DETAILED DESCRIPTION

Figure 1:
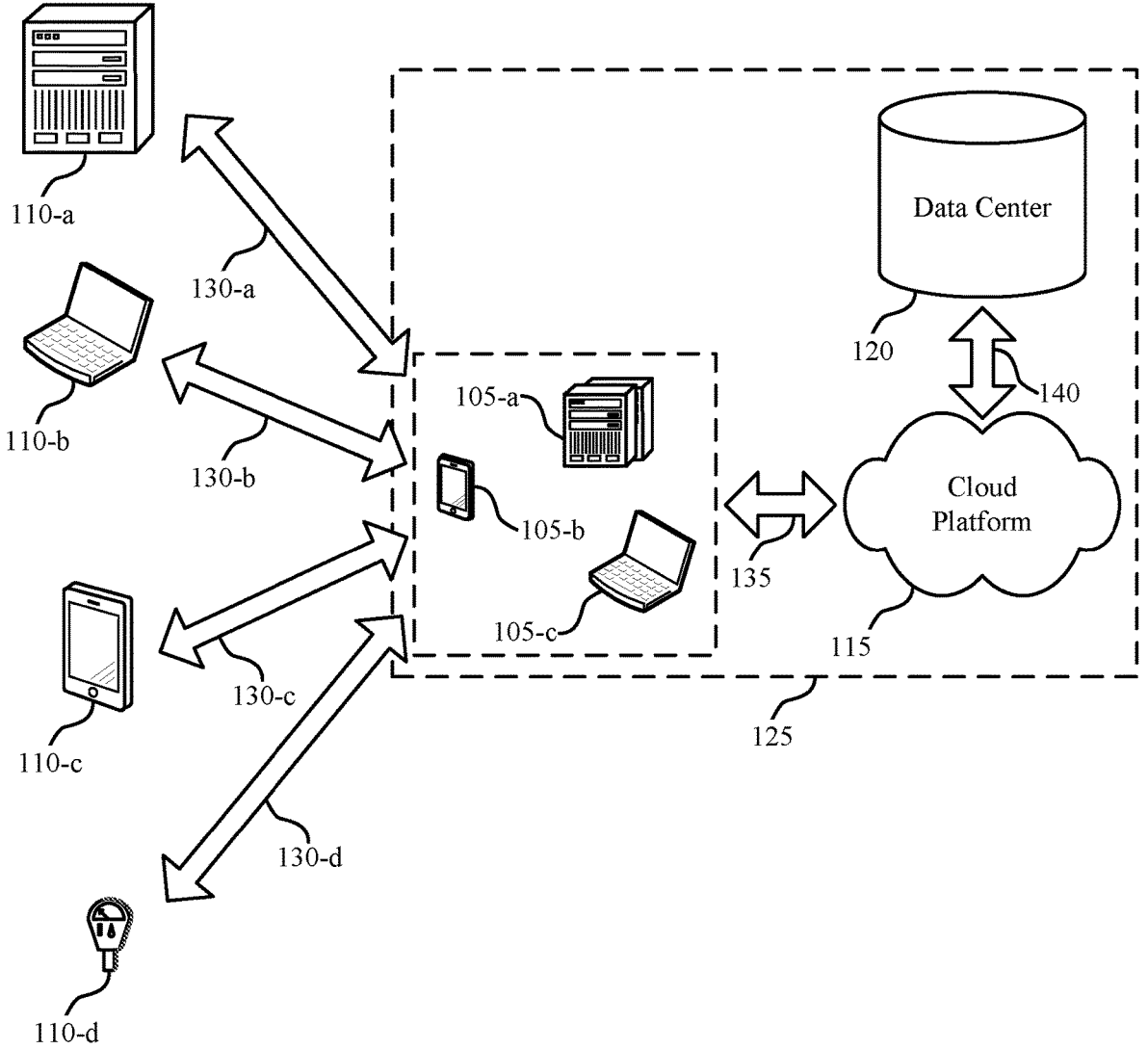
FIG. 1 illustrates an example of a system for cloud computing that supports ranking and marking messages in a group-based communication system using machine learning techniques in accordance with aspects of the present disclosure.

A group-based communication system may provide access to a group-based communication platform, which may in turn support multiple group-based communication channels. A group-based communication channel may provide a virtual space in which users of a group or team may communicate, for example, by posting messages, entering hangout meetings, performing calls, sharing files, or communicating using any other means. In some systems, a workspace or organization (e.g., a tenant of a multi-tenant database system or another organization or team) may use multiple different channels within the group-based communication platform. In some examples, a user may post a message (e.g., any type of post supported by the group-based communication system) to a group-based communication channel, such as a public or private channel with a list of members, a direct message conversation between a set of users, a huddle or other communication channel via the group-based communication system, or any other group-based communication channel. The group-based communication channel may display posts sequentially. Accordingly, as additional posts are added to the group-based communication channel, an older post may no longer be visible with a user interface displaying the group-based communication channel (e.g., without a user remembering when a message was posted and scrolling to the relevant message). As such, a user may potentially miss (or be late) responding to a message if the user does not respond when first notified of the message. Further, automation or models associated with other systems may fail to accurately predict messages to mark for later or a ranking of messages within a user view based on the automation or models failing to account for features specific to a group-based communication system (e.g., concurrency data, channel interaction data, channel types, organizational structure information).

In some examples, a group-based communication system may use a machine learning model to determine whether to automatically mark a post for later for a user. The group-based communication system, or another system, may train the machine learning model to accept, as inputs, a set of features associated with a message and to output an indication of whether to mark the message for later for a user. Marking the message for later may add the message to a set of messages saved for later, which the user may view within a "Later" tab or user view. The set of features may include at least a semantic embedding of the message within an embedding space (e.g., a vector space). Additionally, or alternatively, the set of features may include other features that are specific to a group-based communication environment, such as concurrency data, channel interaction data, a channel type, organizational structure information, or other features. The model may automatically mark messages for later or may suggest, to a user, messages to mark for later. If users mark additional messages for later, or if users remove messages from the set of messages saved for later (e.g., removing messages marked or suggested by the machine learning model), the group-based communication system, or another system, may retrain or update the machine learning model based on the new user data to improve the accuracy of the model. In some cases, the machine learning model may be an example of a classification model or neural network.

Additionally, or alternatively, the group-based communication system may use a machine learning model to determine a ranking of posts (e.g., messages, reminders) for a user view: The ranking of posts may indicate an order for displaying the posts within the user view (e.g., a later tab, a drafts tab, a threads tab, a files tab) for a specific user. For example, the machine learning model may rank the posts based on importance to a user, rather than simply by due dates or creation dates, to ensure the user initially sees the most important items (e.g., as determined by the machine learning model) displayed within a user interface for the user view. The ranking may be based on sets of features corresponding to respective messages within the user view, where the sets of features may include at least some features specific to a group-based communication system (e.g., concurrency data, channel interaction data, a channel type, organizational structure information). In some cases, the machine learning model may be an example of a gradient-boosted tree or another ranking model.

Aspects of the disclosure are initially described in the context of a system for cloud computing. Additional aspects of the disclosure are described with reference to a group-based communication system, user interfaces, machine learning models, and process flows. Aspects of the disclosure are further illustrated by and described with reference to apparatus diagrams, system diagrams, and flowcharts that relate to ranking and marking messages in a group-based communication system using machine learning techniques.

FIG. 1 illustrates an example of a system 100 for cloud computing that supports ranking and marking messages in a group-based communication system using machine learning techniques in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples, the system 100 may further support a group-based communication system. For example, a group-based communication system may provide a platform for users to communicate within groups or teams defined by group-based communication channels. The group-based communication system may leverage one or more aspects of the subsystem 125. For example, data objects stored in the data center 120, the cloud platform 115, or both may be accessed or otherwise referenced within a channel of the group-based communication system. Additionally, or alternatively, the cloud platform 115 may support a group-based communication platform.

In the group-based communication system, a user may save posts (e.g., messages, files) for later, for example, to reply to a message at a later time, to complete a task associated with a message at a later time, to review a file at a later time, or for some other reason. The group-based communication system may use a machine learning model to determine whether to automatically mark a post for later for a user, for example, based on a set of features including at least a semantic embedding of the post. The set of features may leverage aspects of the group-based communication system to improve the accuracy of predicting which posts (e.g., messages, files, links) to mark for later. For example, how users interact within a group-based communication channel may affect whether the machine learning model suggests marking a post for later. Additionally, or alternatively, the system may use a machine learning model to determine an order for displaying items (e.g., posts, reminders, files) within a user view (e.g., a later tab, a drafts tab, a threads tab, a files tab) for a user. For example, the machine learning model may rank the items based on importance to a user, rather than simply by due dates or creation dates, to ensure the user initially sees the most important items displayed within the user interface for the specific user view.

Some other systems may support users marking messages for later. However, in some cases, a user may fail to mark a message for later, potentially resulting in the user failing to respond to an important message. Additionally, or alternatively, some other systems may display messages in an order according to timestamps corresponding to the messages (e.g., creation dates for the messages, due dates for the messages). However, in some such cases, important messages may become buried within a list of messages based on the timestamps, potentially resulting in a user failing to effectively prioritize the messages by importance. Additionally, or alternatively, some other systems may use algorithms or machine learning models to manage messages (e.g., emails or texts). However, such algorithms or models may rely on features available for these systems, such as features associated with an email application or a text message thread. For example, receiving an email may indicate a direct intent for a user to respond to the email. A model automatically marking emails for later (e.g., flagging an email as a to-do item, marking an email with a star, adding an email to a tasks list) may benefit from this inherent intent associated with specific recipients of the emails. However, a group-based communication system may support different features than other systems (e.g., email applications), resulting in different model training techniques.

For example, in contrast to such other systems, the system 100 may leverage one or more aspects of a group-based communication system to improve message handling. The system 100 may use one or more machine learning models that are trained based on features specific to group-based communication messages. For example, the system 100 may train a machine learning model based on a context of a channel within the group-based communication system, how a user has interacted with a message already within the group-based communication system, how other users have interacted with the message within the group-based communication system (e.g., replies, reactions, links clicked, or any other interactions across a set of users), historical interactions between users (e.g., within a specific channel, across multiple channels), or any combination thereof. Additionally, a message posted to a group-based communication channel (e.g., a public channel) may not indicate an intent for a response in the same way that receiving an email indicates an intent for a response, at least because a message posted to a channel may not be directed to everyone within the channel. Accordingly, a machine learning model for the group-based communication system may use additional contextual information and different method for determining the importance of messages posted within the group-based communication system. As described herein, the group-based communication system may leverage machine learning techniques that provide improved accuracy in marking and ranking messages specifically within the context of the group-based communication system.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
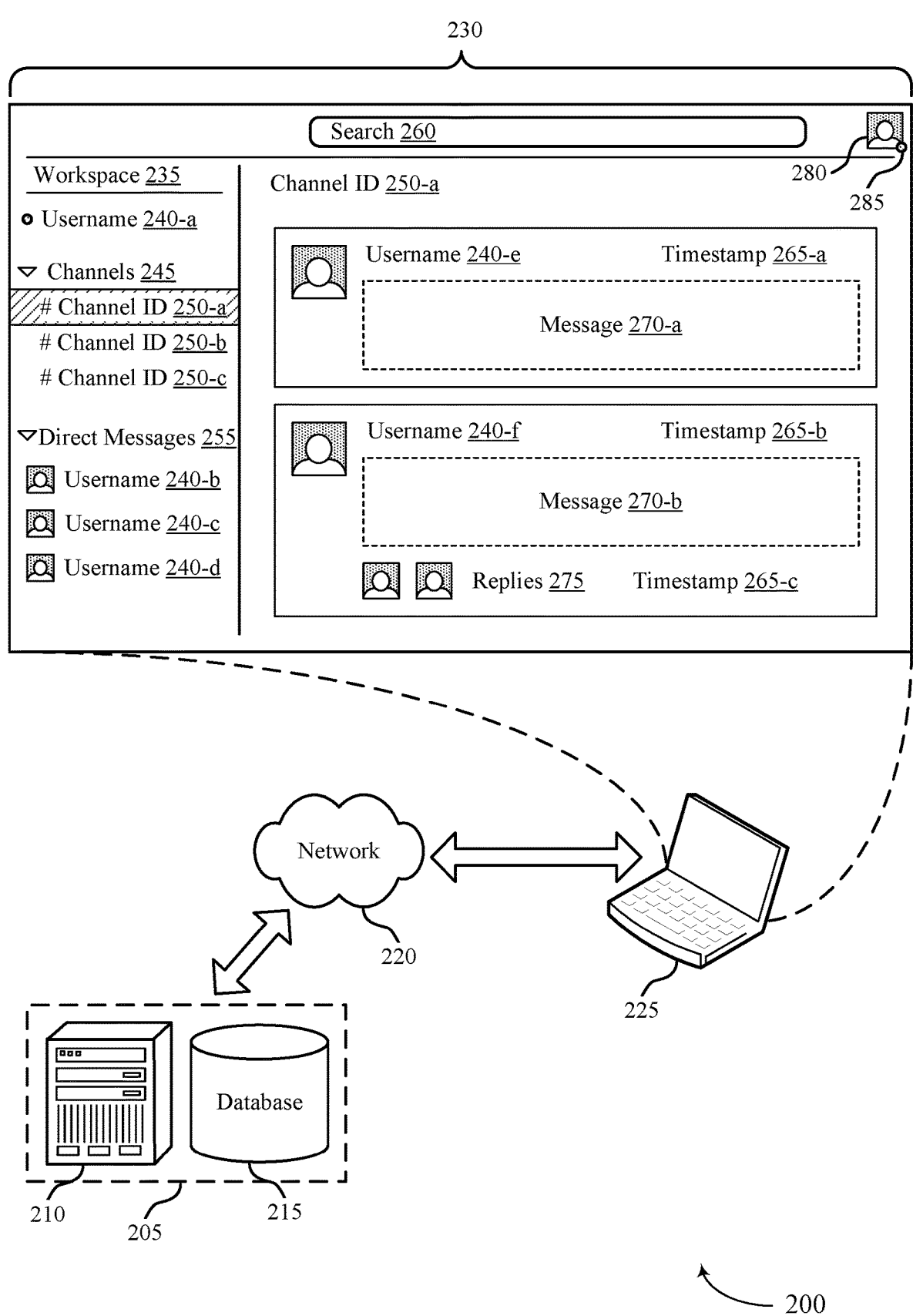
FIG. 2 illustrates an example of a group-based communication system that supports ranking and marking messages in a group-based communication system using machine learning techniques in accordance with aspects of the present disclosure.

FIG. 2 illustrates an example of a group-based communication system 200 that supports ranking and marking messages in a group-based communication system using machine learning techniques in accordance with aspects of the present disclosure. The group-based communication system 200 may be implemented as part of or with a system 100. For example, the group-based communication system 200 may leverage data stored at a cloud platform 115, a data center 120, or some combination thereof. The group-based communication system 200 may include a group-based communication platform 205 hosted by one or more computing devices 210, databases 215, or a combination thereof. The group-based communication system 200 may support displaying data to a user via a user interface 230 of a user device 225. In some examples, the user device 225 may communicate with the group-based communication platform 205 via a network 220. In some cases, the user device 225 may be an example of a cloud client 105 or a contact 110 in a system 100, as described with reference to FIG. 1.

The group-based communication platform 205 may leverage a network-based computing system to enable users of the group-based communication platform 205 to exchange data. By being "group-based," the platform may support communication channels, messages, virtual spaces, or a combination thereof organized into groups of users. The group-based communication platform 205 may include security policies or features that define access to resources (e.g., channels, messages) according to such groups. In some examples, the groups of users may be defined by group IDs, which may be associated with common access credentials, domains, or the like. In some examples, the group-based communication platform 205 may provide a virtual space enabling users to chat, meet, call, collaborate, transfer files or other data, or otherwise communicate within groups. In some examples, a group may be associated with a workspace 235, enabling users associated with the group to communicate within the group in a secure and private virtual space. In some cases, members of a group or a workspace may be associated with a same organization (e.g., a tenant of a multi-tenant database system). In some other cases, members of a group or a workspace may be associated with different organizations (e.g., entities with different organization IDs, such as different tenants in a multi-tenant database system).

One or more computing devices 210 may support the group-based communication platform 205. For example, the one or more computing devices 210 may include an application server, a database server, a cloud-based server or service, a worker server, a server cluster, a virtual machine, a container, or any combination of these or other computing devices supporting data processing. For example, the one or more computing devices 210 may include one or more processors, memory, computer-readable media, or a combination thereof. The one or more computing devices 210 may perform functions and provide features as described herein with respect to the group-based communication platform 205. The group-based communication platform 205 may further include one or more databases 215, which may include cloud-based data storage, physical data storage, or both. In some cases, the one or more databases 215 may be memory components of the one or more computing devices 210. The one or more databases 215 may store data associated with the group-based communication platform 205. For example, the one or more databases 215 may include data relating to channels, users, workspaces 235, or any combination thereof, logs of messages 270, security information, or any other information relevant to the group-based communication platform 205.

A user may access the group-based communication platform 205 using a user device 225. The user device 225 may be an example of a laptop, a desktop computer, a smartphone, a tablet, a smart device, or any other device operated by a user and including a user interface 230. The user device 225 may communicate with the group-based communication platform 205, for example, via a network 220. The network 220 may be any type of communication network, such as a local area network or a wide area network, the Internet, a wireless network, a cellular network, a local wireless network, Wi-Fi, Bluetooth®, Bluetooth Low Energy (BLE), Near Field Communication (NFC), a wired network, or any combination of these or other networks. The network 220 may support proper network protocols for transferring data between the user device 225 and the group-based communication platform 205. For example, the user device 225, the group-based communication platform 205, or both may apply one or more security protocols (e.g., encryption) for securely transferring data over the network 220. In some cases, one or more aspects of the group-based communication platform 205 may be implemented at the user device 225. For example, the user device 225 may download an application corresponding to the group-based communication platform 205 and may store information relating to the group-based communication platform 205 locally at the user device 225. In some other examples, the user device 225 may access the group-based communication platform 205 in a web browser.

The user device 225 may include a user interface 230 that may display information relating to the group-based communication platform 205. Additionally, a user may interact with the user interface 230 to communicate with other users, view data, modify data, or otherwise perform actions associated with the group-based communication platform 205. The group-based communication platform 205 may support multiple group-based communication channels, and the user interface 230 may display information relating to a group-based communication channel corresponding to a channel ID 250-a. The user interface 230 may display a sidebar including navigation information for a user and a central pane (e.g., a main pane) including the channel contents, such as a sequential listing of messages 270 corresponding to the channel ID 250-a. A channel (e.g., a group-based communication channel) may provide a virtual space for a group of users to communicate via messages, hangouts, video or audio calls, files, or any other means of communication. The group of users may include members of the channel, non-members of the channel with access to the channel, or both.

A user may log into the group-based communication platform 205 (e.g., using a username 240-a, a password, or both corresponding to a user account). In response to the user logging in, the group-based communication platform 205 may send, for display in the user interface 230, data corresponding to the user (e.g., corresponding to an account for the user). For example, the user may be associated with a specific workspace 235, a set of channels 245, a set of connections, a set of threads, a set of direct messages 255, or any combination of these. The user device 225 may retrieve or otherwise access the relevant information for the user (e.g., based on the username 240-a or another user ID) and surface the information for display in the user interface 230 according to a display format.

As an example, in a sidebar (e.g., a navigation pane), the user interface 230 may display an indication of a workspace 235 corresponding to the user and the username 240-a of the user. The sidebar may further include indications of a set of channels 245 using the respective channel IDs. For example, the set of channels 245 may include the channels to which the user is a member. As illustrated, the set of channels 245 may include a first channel corresponding to a first channel ID 250-a, a second channel corresponding to a second channel ID 250-b, and a third channel corresponding to a third channel ID 250-c. It is to be understood that the set of channels 245 may include any quantity of channels for selection by the user. The user may select a channel from the listing of the set of channels 245, and the user interface 230 may display the selected channel (e.g., the messages 270) associated with the selected channel) in the central pane. The sidebar may further include a set of direct messages 255 between the user with the username 240-a and one or more other users (e.g., in a DM group). For example, the set of direct messages 255 may include the usernames 240 (or nicknames) of the users communicating via direct messages with the user. In some examples, the list of users may include users added by the user with username 240-a, users who have current, ongoing direct message conversations with the user with username 240-a, or both. As illustrated, the set of direct messages 255 may include indications of a user with a first username 240-b, a user with a second username 240-c, and a user with a third username 240-d, although any quantity of users may be include in the set of direct messages 255. Selecting a username 240 from the set of direct messages 255 may cause the user interface 230 to display a set of direct messages between the logged in user and the selected user or group of users in the central pane (e.g., direct messages that are stored in the system and displayed in a sequential order).

The central pane of the user interface 230 may display the contents of a selected channel. For example, if the user selects a channel with a channel ID 250-a, the central pane may display the selected channel ID 250-a, as well as data corresponding to this selected channel ID 250-a. The data for the channel may include a sequential listing of messages 270 posted to the channel. For example, a user with a username 240-*e* may post a first message 270-*a* at a first time corresponding to a timestamp 265-*a*. The user interface 230 may display, for the channel, this information, as well as affordances supporting actions associated with this information. For example, a user may react to the message 270-*a*, reply to the message 270-*a*, or both. As illustrated, another user with a username 240-*f* may post a second message 270-*b* at a time corresponding to a timestamp 265-*b*, and one or more users may reply to the message 270-*b*. The user interface 230 may indicate a set of replies 275 and one or more timestamps 265-*c* associated with the replies 275 (e.g., a timestamp 265-*c* corresponding to a most recent reply) with the message 270-*b*. Selecting the set of replies 275 may cause the user interface 230 to display the replies in a second sidebar (e.g., as a thread of messages).

The messages 270 may include text or other objects, such as files, photos, audio files, video files, documents, uniform resource locator (URL) links, or any other objects. If the selected channel is private, member of the channel may view the information related to the channel, while nonmembers of the channel may be blocked from viewing the information. If the selected channel is public, members and nonmembers of the channel may view the relevant information. In some cases, channels, users, workspaces 235, accounts, or some combination thereof may include accessibility settings or rules with may define viewing capabilities, editing capabilities, or both.

The user interface 230 may further support search functionality using a search bar 260. Additionally, or alternatively, the user interface 230 may indicate a profile picture 280 of the currently logged in user, as well as a connection status 285 (e.g., online, offline, busy) of the user.

The group-based communication system 200 may support multiple user views. For example, a user view may display, for a user via the user interface 230, a specific channel view; a specific direct message conversation view, a specific user profile view, or some other user view. Such user views may display information that may be available to other users (e.g., a specific set of users with the relevant permissions, memberships, or access levels). In some other examples, a user view may display a "Later" view (e.g., a set of messages saved for later, a set of reminders, or both), a "Drafts" view (e.g., a set of draft messages not yet posted within the group-based communication system 200), a "Threads" view (e.g., a set of most-recent posts or updates relevant to a user), a "Files" view (e.g., a set of files accessible by the user), or some other view relevant to a specific user (e.g., the user logged into the group-based communication platform 205 with the username 240-*a*).

The group-based communication system 200 may prioritize items (e.g., messages, files, reminders) within a tab (e.g., a user view, such as the later user view) using a machine learning model. This prioritization may involve the group-based communication system 200 pushing important items to the top of a display order, such that high-priority items are displayed within the user interface 230 when a user selects a specific user view. To view other items (e.g., relatively less important items), the user may scroll through the set of items corresponding to the user view. The machine learning model may predict message importance (or may otherwise determine an order) based on user interactions (e.g., user historical data) within a group-based communication channel, user interactions with a message, historical user interactions with messages, a message author, message contents, or any combination of these or other features associated with the message. In some examples, the group-based communication system 200 may determine different orders for messages within different user views, for example, based on different trained machine learning models for ranking message importance within different user views. For example, a message ranked first for display within the threads user view may not be ranked first for display within the later user view (e.g., based on features carrying different weights for these two rankings, based on using different features for determining these two rankings).

Additionally, or alternatively, the group-based communication system 200 may proactively identify messages to save for later for a specific user (e.g., the user logged into the group-based communication platform 205) using another machine learning model. The group-based communication system 200 may suggest such messages to the user based on similar features (e.g., the same features or other features) associated with the messages. The machine learning model may identify important messages with a relatively high probability (e.g., above a threshold confidence) that the user should respond to the message later (e.g., if suggested). Responding to the message may involve replying to the message, sharing the message, reacting to the message, copying a link associated with the message, performing a task indicated by the message, or any other message response.

In some examples, the group-based communication system 200 may use another machine learning model to automatically generate reminders for a user, for example, based on posts within the group-based communication system 200. For example, the group-based communication system 200 may create a reminder for a user if the group-based communication system 200 detects a due date associated with a message (e.g., based on the raw text of the message or a semantic embedding of the message). The group-based communication system 200 may trigger sending the reminder for display within the user interface 230 based on a current time and a due date associated with the created reminder. The automatically created reminders may further improve user experience within the group-based communication system 200.

Figure 3A:
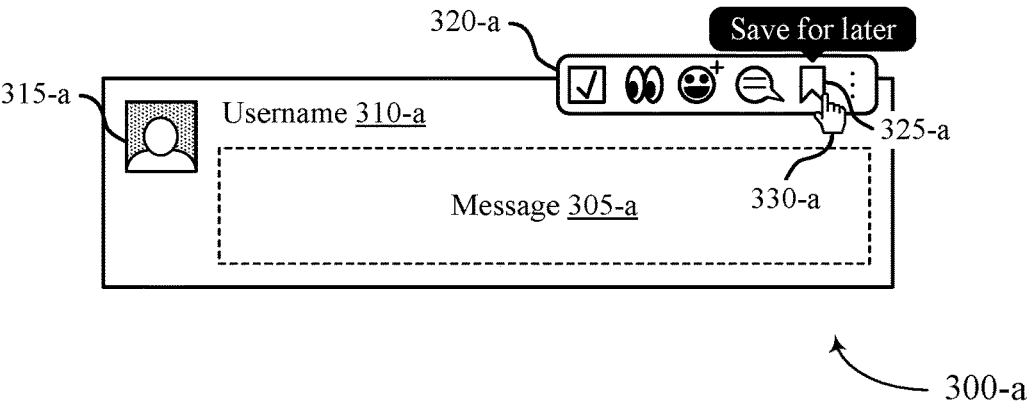
FIGS. 3A, 3B, and 3C illustrate examples of marking messages and creating reminders for later that support ranking and marking messages in a group-based communication system using machine learning techniques in accordance with aspects of the present disclosure.
Figure 3B:
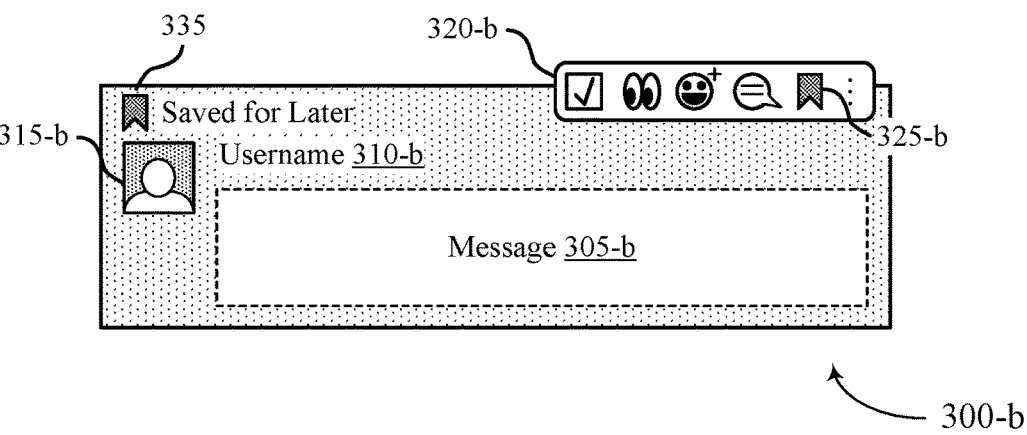
Figure 3C:
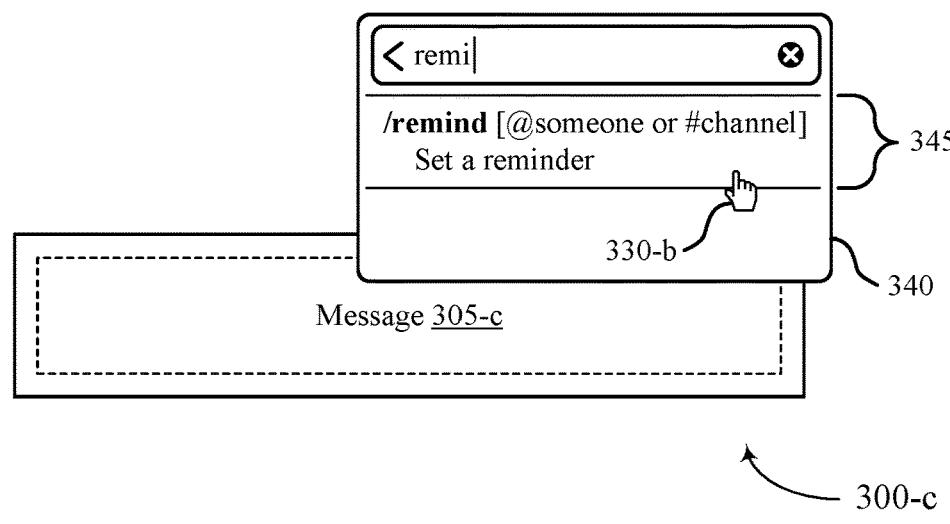

FIGS. 3A, 3B, and 3C illustrate examples of marking messages and creating reminders for later that support ranking and marking messages in a group-based communication system using machine learning techniques in accordance with aspects of the present disclosure. FIG. 3A illustrates an example of marking a message for later 300-*a*. For example, a user may mark any type of post in a group-based communication system, such as the group-based communication system 200 as described herein with reference to FIG. 2, for "later." Marking a post for later may add the post to a set of posts for inclusion in a later tab or later user view. The group-based communication system may support marking multiple types of posts for later, such as messages (e.g., messages in group-based communication channels, direct messages between users or groups of users), links, files, or any other types of posts. For example, a user may mark a message 305-*a* (e.g., posted by a user corresponding to a username 310-*a* and a profile picture 315-*a*) for later.

The group-based communication system may display a set of options 320-*a* with a post in a user interface. In some cases, the system may display the set of options 320-*a* for a post when a user hovers the mouse 330-*a* over the specific post. In some examples, the set of options 320-*a* may include one or more reaction icons for reacting to the post (e.g., a "Completed" icon, a "Taking a look . . . " icon), a menu with additional reaction icons, an option for replying to the post, a menu with additional actions to perform, or any combination of these or other options. Additionally, the set of options 320-a may include a save for later option 325-a. If the user selects the save for later option 325-a (e.g., by clicking on the save for later option 325-a icon with the mouse 330-a), the post may be added to a set of posts saved for later by the user.

The group-based communication system may train a machine learning model based on posts marked for later by a user or set of users (e.g., users within a specific organization or team, users across the group-based communication system). For example, the system may train the machine learning model to predict which posts a user or set of users are expected to mark for later. In some examples, the group-based communication system may train a single model based on posts marked for later by multiple users of the group-based communication system. In some such examples, the model may accept as input a feature representing user historical data indicating which posts the specific user marked for later. In some other examples, the group-based communication system may train a user-specific model based on posts marked for later by the specific user. If a user marks a post for later, the system may train or update a machine learning model to improve the accuracy of the model predicting posts to mark for later. In some cases, the model may automatically mark a post for later for a user based on an output of the model. In some other cases, the model may suggest, to the user, marking the post for later based on the output of the model, and the user may select whether or not to mark the post for later. In some examples, the model may automatically mark a post for later if a prediction accuracy for marking the post for later satisfies an accuracy threshold and may suggest marking the post for later if the prediction accuracy fails to satisfy the accuracy threshold. Additionally, or alternatively, the user may select whether the model is authorized to automatically mark posts for later (e.g., in a user setting or preference).

FIG. 3B illustrates an example of a message marked for later 300-b. For example, a user may select to mark a post for later. In response to the selection, the group-based communication system may update a rendering of the post to visually indicate via the user interface that the post is marked for later. For example, the group-based communication system may highlight the post with a different color (e.g., blue), add a tag 335 indicating that the post is saved for later, or otherwise indicate the post in some other way. For example, if a user marks a message 305-b (e.g., posted by a user corresponding to a username 310-b and a profile picture 315-b) for later, the group-based communication system may highlight the message 305-b in the user interface for the user. However, the group-based communication system may refrain from highlighting the message 305-b for other users (e.g., saving a message for later may be specific to a user). Additionally, or alternatively, in some cases, in the set of options 320-b, the system may highlight the icon representing the save for later option 325-b to indicate that the message 305-b is saved for later. If the user selects the save for later option 325-b again (e.g., by clicking on the save for later option 325-b icon with the mouse when the message 305-b is currently saved for later), the post may be removed from the set of posts saved for later by the user, and the system may update how the message 305-b is displayed to indicate that the message 305-b is not marked for later.

In some examples, deselecting a post that was saved for later may not affect the machine learning model (e.g., the model that predicts which posts a user or set of users are expected to mark for later). For example, a user may deselect a post based on the user completing a task associated with the post (e.g., responding to the post saved for later, completing a task indicated by the post saved for later). In such an example, the deselection may not indicate that the post should not be saved for later. Instead, the deselection may confirm that the post was correctly saved for later and completed at a later time. However, in some other examples, deselecting a post that was saved for later may affect the machine learning model. For example, if a user accidentally selects to save a post for later, and then deselects the post to correct this mistake, the deselection may indicate that the post should not be saved for later. Accordingly, in some cases, if the deselection occurs within a threshold time after the selection to save the post for later (e.g., within five seconds), the system may refrain from using the post as a post saved for later for machine learning model training.

In some cases, the visual indication for a post saved for later may be the same whether the post was saved for later manually by a user or automatically based on an output of a machine learning model. In some other cases, the visual indication for a post saved for later may be different depending on whether the post was saved for later manually by a user or automatically by a machine learning model. For example, the group-based communication system may use different highlighting colors for indicating a message saved for later by a user and a message saved for later by the machine learning model. In yet some other cases, the visual indication may be configurable by a user, such that the user may set how to display messages saved for later, as well as whether manual and automatic messages saved for later are displayed using the same or different schemes.

FIG. 3C illustrates an example of creating a reminder for later 300-c. For example, the group-based communication system may support a user creating a reminder 345 within the group-based communication system. In some cases, the system may support a set of shortcuts, including a shortcut to create a reminder 345. If a user is typing a message 305-c or otherwise creating a post, the user may input a shortcut indicator (e.g., type a backslash) to trigger calling a shortcut. In some examples, inputting the shortcut indicator may trigger a popup 340 displaying the supported shortcuts. If a user types "/remind" or selects the reminder 345 shortcut (e.g., by clicking on the reminder 345 shortcut in the popup 340 with the mouse 330-b), the system may create a reminder 345. The user may create a personal reminder 345 (e.g., a reminder 345 that is visible for the user who created the reminder 345), a reminder 345 for one or more other users (e.g., which may be visible just to the one or more other users or to both the user who created the reminder 345 and the one or more other users), a reminder 345 for a group-based communication channel (e.g., which may be visible to any members of the channel or any users with permission to view the channel), or any combination thereof. The group-based communication system may send the created reminder 345 for display via a user interface upon creation, based on a time set for the reminder, or both. For example, a user device may display a reminder 345 as a popup within the group-based communication platform, as a popup external to the group-based communication platform, within a relevant group-based communication channel, or via another display option. In some examples, the user creating the reminder 345 may configure the timing for displaying the reminder 345, another trigger for displaying the reminder 345, the format for displaying the reminder 345, or any combination thereof.

A created reminder 345 may also be added to a set of posts saved for later for a user. Additionally, or alternatively, the group-based communication system may train a machine learning model based on the reminders 345 created for one or more users. The system may use user-created reminders to train the machine learning model. For example, the system may train the machine learning model to predict a trigger for creation of a reminder 345 for a user or a set of users. In some examples, the machine learning model may automatically create a reminder 345 for a user if the system detects the predicted trigger for the reminder 345. In some cases, the model may automatically create a reminder 345 for a user based on an output of the model. In some other cases, the model may suggest, to the user, creating the reminder 345 based on the output of the model, and the user may select whether or not to create the reminder 345. In some examples, the model may automatically create a reminder 345 if a prediction accuracy for creating the reminder 345 satisfies an accuracy threshold and may suggest creating the reminder 345 if the prediction accuracy fails to satisfy the accuracy threshold. Additionally, or alternatively, the user may select whether the model is authorized to automatically create reminders 345 (e.g., in a user setting or preference). Similar to marking posts for later, user-created reminders and machine learning model-created reminders may have the same or different display formats.

Figure 4:
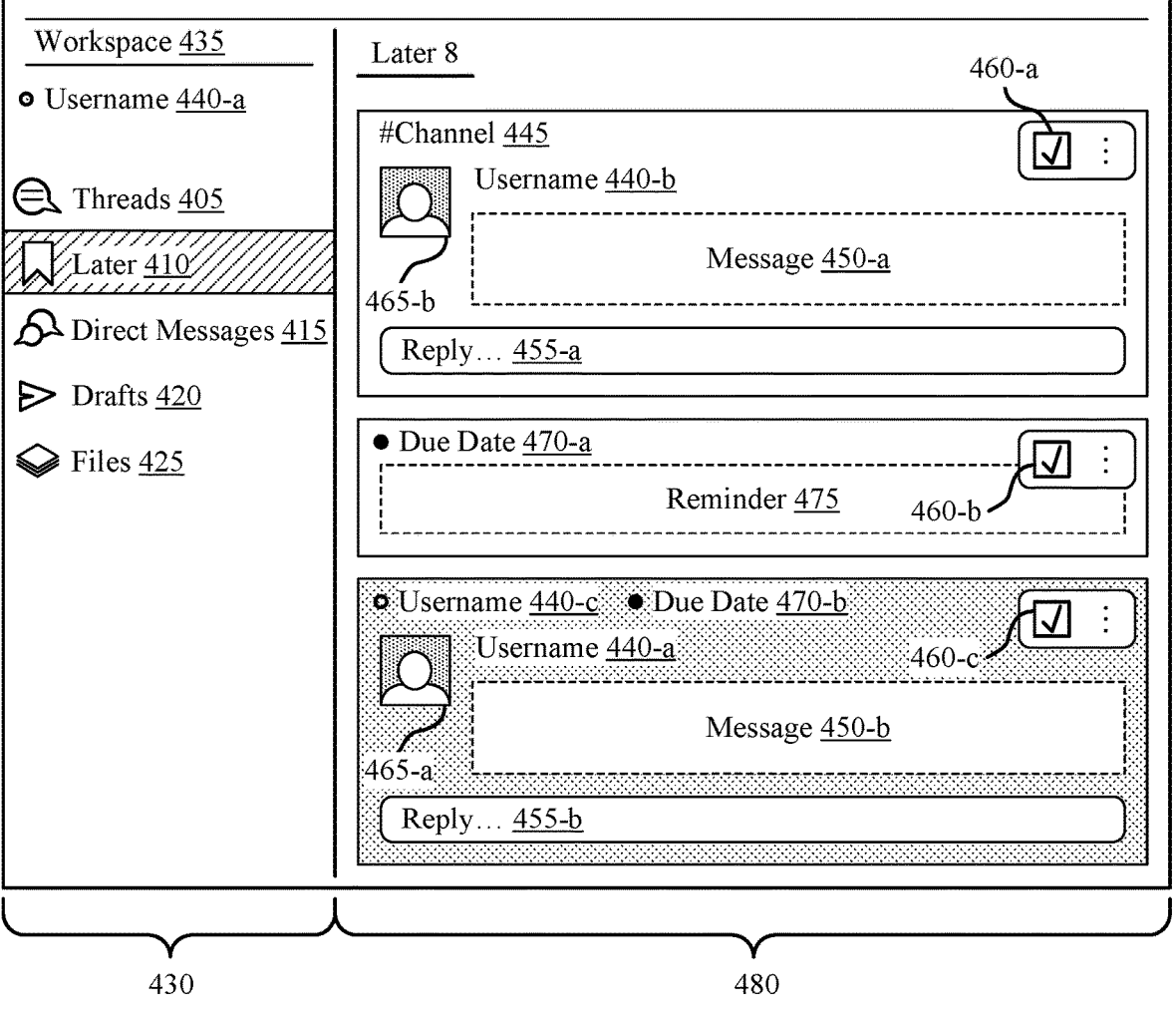
FIG. 4 illustrates an example of a user interface that supports ranking and marking messages in a group-based communication system using machine learning techniques in accordance with aspects of the present disclosure.

FIG. 4 illustrates an example of a user interface 400 that supports ranking and marking messages in a group-based communication system using machine learning techniques in accordance with aspects of the present disclosure. The user interface 400 may be an example of a user interface 230 as described with reference to FIG. 2. For example, the user interface 400 may display, at a user device, group-based communication messages for a specific user of a group-based communication system. For example, a user with a username 440-*a* and included within a workspace 435 may log into a group-based communication platform. Using a sidebar 430, the user may select a user view for display via a main pane or central pane 480. In some cases, the user may select to view a group-based communication channel within the central pane 480. In some other cases, the user may select to view a direct message conversation between one or more users within the central pane 480. In yet other cases, the user may select to view a different user view within the central pane 480.

For example, the group-based communication system may support a threads 405 user view; a later 410 user view, a direct messages 415 user view, a drafts 420 user view, a files 425 user view, or some combination of these or other user views. As illustrated, the user may select, via the sidebar 430, to view the later 410 user view within the central pane 480. In some examples, this may be referred to as a "Later" tab, which may display all items that are saved for later for the specific user (e.g., the user with the username 440-*a*). For example, the later 410 user view may display posts (e.g., messages, files) saved for later for the user, reminders 475 created for the user, or a combination thereof, as described herein with reference to FIGS. 3A through 3C. For example, the later 410 user view may display posts marked for later by the user, reminders created by the user or another user, posts marked for later automatically (e.g., based on a machine learning model), reminders created automatically (e.g., based on a machine learning model), or any combination thereof. For example, the later 410 user view may display a first message 450-*a* marked for later by the user, a reminder 475 created by the user, and a second message 450-*b* marked for later by a machine learning model. In some cases, posts may be displayed using a same visual style whether or not the posts were marked for later by a user or a machine learning model. In some other cases, posts marked for later by a user may be displayed using a different visual style (e.g., using a different highlighting color or color scheme) than posts marked for later by a machine learning model. Similarly, the later 410 user view may handle reminders that are user-created versus machine learning model-created. The later 410 user view may include an indication of the quantity of items (e.g., posts and reminders) saved for later for the user (e.g., 8 items saved for later, as illustrated in FIG. 4).

The later 410 user view may include a first post marked for later. The first post may be an example of a first message 450-*a* posted to a group-based communication channel 445 by a user with a username 440-*b* and a profile picture 465-*b*. The user with the username 440-*a* may have marked this message 450-*a* for later in the group-based communication channel 445, for example, to respond to this post at a later time. The later 410 user view may support a reply option 455-*a* for the user to reply to the message 450-*a* via the later 410 user view: Replying to the message 450-*a* via the later tab may cause the reply to also be displayed within the corresponding group-based communication channel 445. In some examples, the later 410 user view may support additional options or inputs. For example, the post saved for later may include a checkmark input box 460-*a*. If the user selects the checkmark input box 460-*a* (e.g., to indicate that the user has replied to the message 450-*a*), the post may be marked as complete and may be removed from being saved for later. As such, the user interface 400 may remove the message 450-*a* from the later 410 user view in response to the user selecting the checkmark input box 460-*a*.

Similarly, the later 410 user view may include a reminder 475. In some examples, the reminder 475 may be associated with a due date 470-*a* (e.g., added by the user creating the reminder 475 or automatically predicted by a machine learning model). The reminder 475 may also include a checkmark input box 460-*b* supporting a user marking the reminder 475 complete.

The later 410 user view may also include a second post marked for later. The second post may be an example of a second message 450-*b* posted to a direct message conversation between the user with the username 440-*a* (e.g., and a profile picture 465-*a*) and a user with a username 440-*c*. A machine learning model may have marked the message 450-*b* for later based on the users within the direct message conversation, the language in the message 450-*b*, the replies (or lack of replies) to the message 450-*b*, an organizational structure, or some combination of these or other features. The machine learning model may additionally create a due date 470-*b* for completing a task associated with the message 450-*b*, for example, based on the timestamp for when the message 450-*b* was posted, language in the message 450-*b*, or any other features. The later 410 user view may additionally support a reply option 455-*b* for the user to reply to the message 450-*b* via the later 410 user view, a checkmark input box 460-*c* for marking the post as complete, or both.

In some systems, the posts, reminders, or both may be ordered within the later 410 user view according to timestamps. In a first example, the posts, reminders, or both may be ordered according to when each post or reminder was marked for later (e.g., by a user or by a machine learning model). In a second example, the posts, reminders, or both may be ordered according to when each post or reminder was created. In a third example, the posts, reminders, or both may be ordered according to due dates assigned to each post or reminder.

However, such orderings may be inefficient or otherwise non-optimal. For example, as illustrated in FIG. 4, the later 410 user view may include eight posts, but only three may be displayed within the user interface 400 at one time based on the user interface size. However, the three posts may not be the most pressing posts for the user to address. For example, if the posts are ordered based on when the posts were created or marked for later, the later 410 user view may fail to prioritize displaying posts with the most pressing due dates. Even if the posts are ordered by due dates, the later 410 user view may fail to prioritize displaying the most important posts to complete. For example, a first post marked for later associated with responding to one's boss may be of higher priority than a second post marked for later associated with responding to a party invitation, even if the due date for the party invitation is more pressing than the due date for responding to the first post.

The group-based communication system may use a machine learning model to determine an order for the posts, reminders, or both within the later 410 user view. The machine learning model may use any quantity or combination of features associated with the posts, reminders, or both to determine an order for the posts, reminders, or both within the user view. The determined order may correspond to prioritizing the items within the later 410) user view according to importance, rather than timestamp. Such an ordering may improve the user experience by surfacing the posts most important to a user at the top of the later 410 user view. Accordingly, when the user selects the later tab, the user interface 400 may initially display the items most important to the user within the central pane 480. The user may scroll down to view the items in descending order of importance. In this way, the later 410 user view may continually remind the user of the most important items saved for later without the user having to create this order or rearrange this order each time a new item is added to the later tab. Additionally, the machine learning model may update the order of displaying items, for example, as a due date approaches, if a message is edited, if replies to the message indicate a new; different level of importance, or any combination thereof. Such a system may reduce the likelihood that the user misses a deadline for an important item saved for later.

In some examples, the user may reorder the items in the later 410 user view. For example, the machine learning model may determine an initial order, and the user may update the order based on user preference. Such reordering may be fed back to retrain the machine learning model based on the user's preferences. In some cases, the system may update a user-specific machine learning model for the user. In some other cases, the system may update a generic machine learning model for any users based on the user-specific feedback.

In some cases, an additional, or alternative, machine learning model may be used to determine orders for posts within the threads 405 user view, the direct messages 415 user view; the drafts 420 user view, the files 425 user view, or any combination thereof. The threads 405 user view may include a set of group-based communication channels, direct message conversations, or a combination thereof. The threads 405 user view may prioritize displaying threads (e.g., conversations within a group-based communication channel or a direct message) with recent user activity (e.g., recent, unviewed posts). However, if multiple threads include unviewed user activity, the threads 405 user view may order the threads based on a machine learning model output. The direct messages 415 user view may include a set of direct message conversations, and a machine learning model may determine an order for the direct message conversations based on one or more features (e.g., quantity of posts within the conversation, frequency of posts within the conversation, connection between the users, an organizational structure). The drafts 420 user view may include posts (e.g., messages, replies) that a user starts but does not send or submit, and a machine learning model may determine an order for the drafts. The files 425 user view may include files visible to the user (e.g., within channels or direct messages), and a machine learning model may determine an order for the files that is most relevant to the user. Accordingly, any user view supported by the group-based communication system may leverage machine learning techniques to organize messages in a preferred order specific to a user.

Figures 5A, 5B:
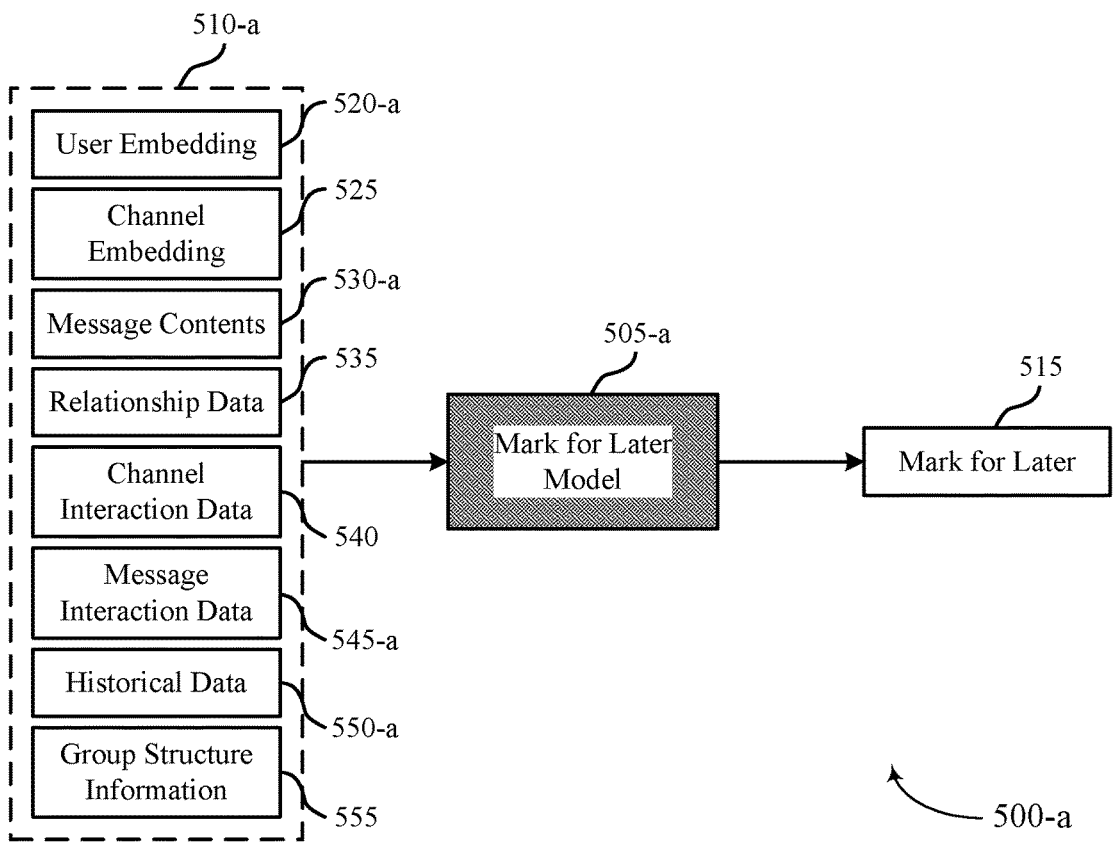
FIGS. 5A and 5B illustrate examples of machine learning models that support ranking and marking messages in a group-based communication system using machine learning techniques in accordance with aspects of the present disclosure.

FIGS. 5A and 5B illustrate examples of machine learning models that support ranking and marking messages in a group-based communication system using machine learning techniques in accordance with aspects of the present disclosure. FIG. 5A illustrates an example of a machine learning model 500-*a* that supports marking messages for later in a group-based communication system using machine learning techniques in accordance with aspects of the present disclosure. The machine learning model 500-*a* may be implemented by a group-based communication system. The machine learning model 500-*a* may be trained to accept a set of features 510-*a* as inputs to a model 505-*a* and may output an indication 515 of whether to mark a message for later in response to the input set of features 510-*a*.

The machine learning model 500-*a* may be trained by the group-based communication system or by some other machine learning system. The machine learning model 500-*a* may be an example of a logistic regression model, a classification model, a random forest model, a neural network (e.g., a feed forward (FF) or deep feed forward (DFF) neural network, a recurrent neural network (RNN), a long/short term memory (LSTM) neural network, or any other type of neural network), or any other machine learning model or heuristic. In some cases, the machine learning model 500-*a* may be an example of a ranking model (e.g., a gradient-boosted tree) or a classification model (e.g., a neural network) configured to identify which messages to save for later for a specific user. For example, a neural network may handle unstructured text data efficiently to support classifying a message as "to mark for later" or "not to mark for later."

The group-based communication system or another system may use any quantity of features (e.g., corresponding to the set of features 510-*a* to be used as inputs to the model) to train the machine learning model 500-*a*. In some cases, the system training the model may iteratively test additional or alternative features to determine how the features affect the accuracy of the machine learning model 500-*a*. The system may leverage the significant quantity of teams, users, and activities performed for the group-based communication system to test features and train or retrain the machine learning model 500-*a*. In some cases, the system may refrain from deploying the machine learning model 500-*a* (or an update to the machine learning model 500-*a*) until the model (or update) has reached a threshold confidence metric.

The group-based communication system or another system may train the machine learning model 500-*a* based on messages marked for later by a user or messages replied to later (e.g., after a threshold period of time) by a user. For example, marking messages for later may represent signals of intent by users and accordingly may be used for training the machine learning model 500-*a*. In some examples, the group-based communication system or another system may train one machine learning model 500-*a* that supports predicting whether to mark a message for later for any users. The machine learning model 500-*a* (e.g., a universal or general model) may use one or more user-specific features such that the output of the machine learning model 500-*a* may represent user-specific tendencies or preferences. In some other examples, the group-based communication system or another system may train organization-specific (or team-specific) machine learning models 500-*a* (e.g., to refrain from using one organization's data or activities to train a model used by another organization within the group-based communication system). For example, if the models are trained using raw text data from the messages (e.g., rather than, or in addition to, text-based embeddings), the system may train organization or team-level models to preserve privacy of the raw text data for each team. In yet some other examples, the group-based communication system or another system may train user-specific machine learning models 500-*a*.

The system may train the machine learning model 505-*a* (e.g., specific weights, nodes, connections, algorithms, or other parameters associated with the machine learning model 505-*a*) to accept a set of features 510-*a* associated with a message posted to the group-based communication system (e.g., a message posted to a channel, a message posted within a direct message conversation, a file) to determine whether to mark the message for later. In some cases, the group-based communication system may generate or otherwise determine the set of features 510-*a* associated with the message in response to the message being posted within the group-based communication system. The group-based communication system may input the generated set of features 510-*a* into the machine learning model 505-*a* (e.g., in response to the message being posted within the group-based communication system).

The set of features 510-*a* may include at least a semantic embedding of the message. For example, the system may input the text of the message (e.g., the message contents 530-*a*) into a semantic embedding function to determine a semantic embedding of the message (e.g., within a vector space). The system may use any word embedding function to map the message's text into a vector space. In some cases, the system may use a semantic embedding function trained using public data to avoid possible privacy concerns for teams within the group-based communication system. Additionally, or alternatively, the system may train—or further train or tune—the word embedding function on group-based communication system data for a team to improve the embedding for the specific context of the group-based communication system. Based on the semantic embedding (e.g., a vector within a vector space), the machine learning model 505-*a* may determine similar messages posted to the group-based communication system (e.g., based on the proximities of the embedded vectors for the messages within the vector space). Accordingly, the machine learning model 505-*a* may be likely to indicate to mark a message for later if the message has a corresponding semantic embedding that is within a threshold distance from a semantic embedding of another message that was marked for later. In some examples, the system may compare raw similarities between message embeddings to determine if a new message is similar to a previously "saved for later" message. In some other examples, the embedding function may cluster "saved for later" messages within the vector space and may determine if a message's embedding is within a threshold distance from the cluster (e.g., from the centroid of the cluster). As described herein, the semantic embedding of the message may be one feature within a set of features 510-*a*, and additional features may affect whether the machine learning model 505-*a* outputs an indication 515 to mark the message for later.

The set of features 510-*a* used to train the machine learning model 505-*a*, used as inputs to the trained machine learning model 505-*a*, or both may include any quantity of features associated with a message (e.g., associated with a group-based communication channel, such as a channel or direct message conversation, within which the message was posted, associated with a user who posted the message, associated with a user viewing the message). In some examples, the set of features 510-*a* may include one or more user embeddings 520-*a*. For example, the system may embed a vector corresponding to a user into a vector space. The machine learning model 505-*a* may indicate whether to mark a message for later for a specific user. For example, if a message is posted to a channel with ten members, the machine learning model 505-*a* may determine whether to mark the message for later for each of the ten members separately (e.g., based on user-specific history or actions). Accordingly, the system may use a user embedding 520-*a* (e.g., a graph embedding) for the user for whom the model is determining whether to mark the message for later. Additionally, or alternatively, the system may use a user embedding 520-*a* for the user who posted the message to the group-based communication system.

In some examples, the set of features 510-*a* may include a channel embedding 525 for the channel or direct message conversation in which the message was posted. For example, the system may use an embedding function to embed a vector corresponding to the group-based communication channel into a vector space. The embedding function may use any set of parameters associated with the channel, such as channel members, whether the channel is public or private, the quantity of messages posted to the channel, the types of messages posted to the channel, or any combination thereof.

In some examples, the set of features 510-*a* may include message contents 530-*a* for the message. In some cases, the set of features 510-*a* may use specific information included within the message (e.g., a date or time mentioned within the text of the message, a task mentioned within the text of the message) in addition or alternative to using the semantic embedding of the message. The message contents 530-*a* may include the body of the message, a subject line for the message, a classification for the message, or any combination thereof. If the message contents 530-*a* includes a date or time, the machine learning model 505-*a* may additionally determine whether to mark the message for later based on a current actual time.

In some examples, the set of features 510-*a* may include relationship data 535 indicating a relationship between users (e.g., the user who posted the message and the user viewing the message). For example, the relationship data 535 may indicate historical interactions between the users (e.g., if the user viewing the message typically replies to messages posted by the user posting the message). In some cases, the relationship data 535 may indicate how often the user reading the message reacts to messages posted by the posting user, saves messages for later posted by the posting user, clicks a link posted by the posting user, or any combination thereof.

In some examples, the set of features 510-*a* may include channel interaction data 540. For example, the channel interaction data 540 may indicate how often different users post to the relevant channel, reply to messages within the channel, react to messages within the channel, save messages for later within the channel, click a link within the channel, share a file within the channel, or any combination thereof.

In some examples, the set of features 510-*a* may include message interaction data 545-*a*. For example, the message interaction data 545-*a* may indicate how other users have interacted with the message (e.g., who has replied to the message, reacted to the message, clicked a link within the message). In some cases, the message interaction data 545-*a* may include whether other users (e.g., similar users) have marked the message for later, how many users have marked the message for later, when the other users have marked the message for later (e.g., within the last hour), or any combination thereof. If a significant quantity of users save a message for later (e.g., above a threshold quantity), the machine learning model 505-*a* may be likely to indicate for another user to also save the message for later.

In some examples, the set of features 510-*a* may include historical data 550-*a*. For example, the historical data 550-*a* may indicate how the user viewing the message has historically engaged with other messages, users, or channels. The historical data 550-*a* may be stored in data logs for the group-based communication system. The historical data 550-*a* may track trends and update the output of the machine learning model 505-*a* if how the user historically interacts with messages changes over time.

In some examples, the set of features 510-*a* may include group structure information 555 indicating an organizational structure of the relevant group or team. In some cases, a user may be more likely to save messages for later that are posted by users higher up on the organizational chart than users lower on the organizational chart. For example, the machine learning model 505-*a* may be likely to indicate for a user to save a message for later that is posted by the user's boss. Additionally, or alternatively, users within a specific division or branch of a company may be more likely to save messages for later that are posted by other users within the same division or branch. The group structure information 555 may allow the machine learning model 505-*a* to account for such organizational preferences.

Additionally, or alternatively, the set of features 510-*a* may include concurrency data. The concurrency data may indicate which users are concurrently active within the group-based communication system or within a specific channel of the group-based communications system. The set of features 510-*a* may include any features relevant to a message, for example, specifically posted within a group-based communication system.

The machine learning model 505-*a* may follow visibility and access rules for users. For example, the group-based communication system may refrain from testing whether to mark a message for later for a user if the user does not have access to the message (e.g., if the message is otherwise not visible to the user).

In some cases, a system may iteratively train the machine learning model 505-*a*. For example, the system may use a first retrieval set of messages to initially train the machine learning model 505-*a*, to initially test the machine learning model 505-*a*, to initially execute the machine learning model 505-*a* after deployment of the model, or any combination thereof. A user may have access to thousands or millions of messages (e.g., across multiple private channels, public channels, direct message conversations) within the group-based communication system. Running all of these messages through the machine learning model 505-*a* may use significant processing resources, time resources, or both (e.g., above thresholds). Additionally, or alternatively, running all of these messages through the machine learning model 505-*a* may cause significant noise to the user (e.g., marking hundreds or thousands of messages for later). Further, some channels, such as public channels with hundreds of members or viewers, may include thousands of messages but may be unlikely to include any messages that the user should save for later. To efficiently and effectively use the machine learning model 505-*a*, the system may initially use messages from one or more relatively high-priority channels for the user (e.g., the channels in which the user is most active, the channels in which the user saves the most messages for later), messages posted by one or more relatively high-priority users (e.g., a boss, a specific team of users), or both. In this way, the system may first apply a coarse filter on the messages to determine a subset of messages to determine whether to mark for later using the machine learning model 505-*a*.

Additionally, or alternatively, the system may include one or more rounds of feedback to improve the accuracy of the machine learning model 505-*a*. For example, the system may initially suggest a subset of messages (e.g., five messages) for a user to save for later. The user may select which of the subset of messages to actually save for later (e.g., three of the five suggested messages). This user selection may be fed back to the machine learning model 505-*a*, and the system may further train the machine learning model 505-*a* in response to the user's selections. In some examples, the system may periodically or aperiodically suggest messages for the user to save for later to receive additional feedback from the user. In some cases, the system may suggest messages that are not predicted to have the highest likelihood of being saved for later (e.g., the system may suggest one or more random or pseudo-random messages), to avoid potential biases in the model training.

The output of the machine learning model 505-*a* may include an indication 515 of whether to mark the message for later for a user viewing the message. The indication 515 may be an example of a binary value (e.g., indicating to either mark or not mark the message for later) or a decimal value (e.g., indicating a confidence of whether to mark the message for later). For example, a decimal value nearer to 1.0 may indicate relatively greater confidence that the message should be marked for later, while a decimal value nearer 0.0 may indicate relatively greater confidence that the message should not be marked for later. A decimal value near 0.5 may indicate relatively poor confidence in a prediction by the model.

FIG. 5B illustrates an example of a machine learning model 500-*b* that supports ranking messages in a group-based communication system using machine learning techniques in accordance with aspects of the present disclosure. The machine learning model 500-*b* may be implemented by a group-based communication system. The machine learning model 500-*b* may be trained to accept sets of features 510-*b* as inputs to the machine learning model 505-*b* and may output an indication 560 of a ranking of messages in response to the input set of features 510-*b*. The machine learning model 500-*b* may be an example of any type of machine learning model or heuristic (e.g., similar to the machine learning model 500-*a*) and may be trained in accordance with a process similar to the process described herein with reference to FIG. 5A. For examples, the machine learning model 500-*b* may use any structures, features, or techniques described herein with reference to the machine learning model 500-*a*.

In some cases, the machine learning model 500-*b* may be an example of a gradient-boosted tree (e.g., XGBoost Ranker or another ranking model) or a neural network optimizing for a ranking objective. For example, the machine learning model 500-*b* may be trained to rank messages within a user view according to importance to a user (e.g., the user accessing the user view via a user device).

When a message is added to a user view (e.g., the "Later" user view or another user view), the group-based communication system may trigger determining a ranking for the message within the messages of the user view. For example, a user may have eight messages saved for later. If the user (or a machine learning model) saves an additional message for later, the group-based communication system may use the machine learning model 500-*b* to determine an order for displaying the nine messages within the later user view. In some examples, the system may input a set of features 510-*b* associated with the new message into the machine learning model 505-*b* to determine where to rank the new message. The outputted indication 560 may indicate a ranking for the new message (e.g., a decimal value or other parameter indicating where the new message fits within the order of the previously-ranked other eight messages). Such examples may support improved processing overhead by reducing the amount of features input into the machine learning model 505-*b*. In some other examples, the system may input multiple sets of features 510-*b* associated with each of the messages (e.g., the nine messages) within the user view to determine a complete ranking for the messages. The outputted indication 560 may indicate a ranking for all of the messages (e.g., an array indicating an order for displaying the messages within the user view for the user). Such examples may support improved accuracy of the ranking over time, because the system may update the ranking as additional information is obtained (e.g., new messages are added to the user view).

The set of features 510-*b* used to train the machine learning model 505-*b*, used as inputs to the trained machine learning model 505-*b*, or both may include any quantity of features associated with a respective message. For example, the system may use multiple sets of features 510-*b* corresponding to respective messages within a user view to train the machine learning model 505-*b*, use as inputs to the machine learning model 505-*b*, or both. In some examples, the set of features 510-*b* may include one or more user embeddings 520-*b*. For example, the system may embed a vector corresponding to a user into a vector space. Accordingly, the system may use a user embedding 520-*b* (e.g., a graph embedding) for the user for whom the model is determining the ranking. Additionally, or alternatively, the system may use a user embedding 520-*b* for the user who posted the relevant message to the group-based communication system.

In some examples, the set of features 510-*b* may include a view embedding 565. The system may determine an embedding corresponding to the specific user view (e.g., a later user view; a drafts user view, a threads user view, a files user view).

In some examples, the set of features 510-*b* may include message contents 530-*b* for the corresponding message. In some cases, the set of features 510-*b* may use specific information included within the message (e.g., a date or time mentioned within the text of the message, a task mentioned within the text of the message) in addition or alternative to using a semantic embedding of the message. The message contents 530-*b* may include the body of the message, a subject line for the message, a classification for the message, or any combination thereof. If the message contents 530-*b* includes a date or time, the machine learning model 505-*b* may additionally determine a ranking for the message based on a current actual time.

In some examples, the set of features 510-*b* may include view interaction data 570. For example, the view interaction data 570 may indicate how the user interacts with the items within the user view. The view interaction data 570 may depend on which tasks the user completes first, which messages the user interacts with, whether the user reorders the items within the user view, or any combination thereof.

In some examples, the set of features 510-*b* may include message interaction data 545-*b*. For example, the message interaction data 545-*b* may indicate how the user has interacted with the message, how other users have interacted with the message (e.g., who has replied to the message, reacted to the message, clicked a link within the message), or both.

In some examples, the set of features 510-*b* may include historical data 550-*b*. For example, the historical data 550-*b* may indicate how the user viewing the message has historically engaged with other messages within the user view or in other user views. The historical data 550-*b* may be stored in data logs for the group-based communication system. The historical data 550-*b* may track trends and update the output of the machine learning model 505-*b* if how the user historically interacts with messages changes over time.

The machine learning model 505-*b* may follow visibility and access rules for users. For example, the group-based communication system may refrain from ranking messages within a user view for a user if the user does not have access to the messages (e.g., if the messages are otherwise not visible to the user).

Figure 6:
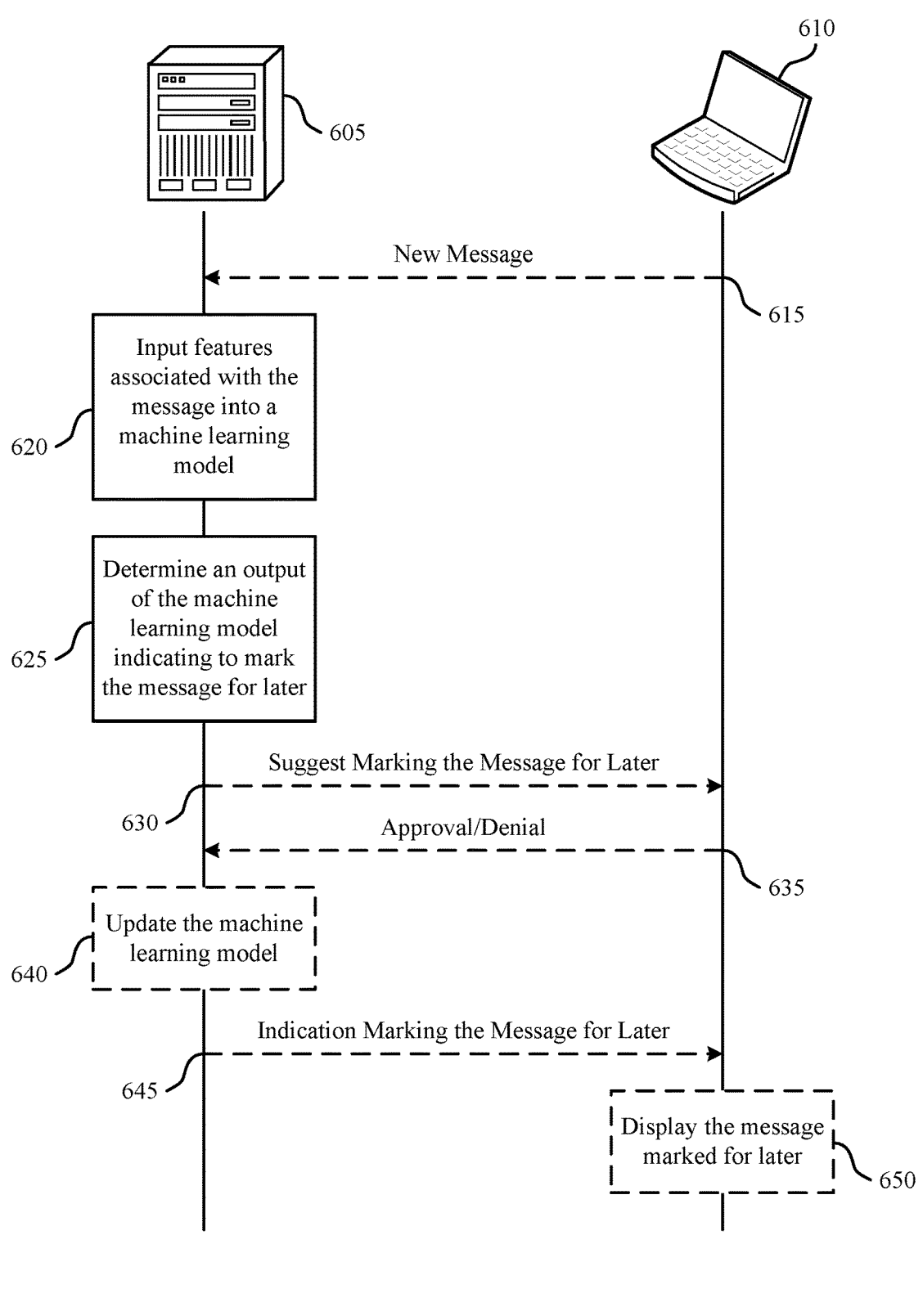
FIGS. 6 and 7 illustrate examples of process flows that support ranking and marking messages in a group-based communication system using machine learning techniques in accordance with aspects of the present disclosure.

FIG. 6 illustrates an example of a process flow 600 that supports marking messages in a group-based communication system using machine learning techniques in accordance with aspects of the present disclosure. The process flow 600 may be implemented by a group-based communication system including one or more computing devices 605 and one or more user devices 610. The computing device 605 (e.g., a processing device or system) may host a group-based communication platform. The computing device 605 may be an example of an application server, a database server, a cloud-based server or service, a worker server, a server cluster, a virtual machine, a container, a network device, a user device, or any combination of these or other computing devices or systems. The user device 610 may access the group-based communication platform over a network, based on downloading an application, or both. The user device 610 may be an example of a laptop, desktop computer, mobile device, smartphone, smartwatch, tablet, virtual reality (VR) device, or any combination thereof. The user device 610 may include a user interface (e.g., GUI) that can present information (e.g., visually, audibly) corresponding to the group-based communication system, as described herein with reference to FIGS. 1 through 5B. Alternative examples of the following may be implemented, where some processes are performed in a different order than described or are not performed at all. In some examples, processes may include additional features not mentioned below, or further processes may be added. Additionally, or alternatively, one or more operations described herein as performed by the computing device 605 may instead be performed by the user device 610, for example, if the user device 610 runs a group-based communication platform application locally.

The computing device 605, the user device 610, or both may run the group-based communication system platform. A user device 610 may display, via a user interface, one or more visual panes including information relating to the group-based communication platform, as described herein with reference to FIG. 2.

At 615, a user (e.g., a first user) operating the user device 610—or a different user (e.g., a second user) operating a different user device (not shown)—may post a new message to the group-based communication system. The computing device 605 may receive the new message posted to a group-based communication channel (e.g., a channel, a direct message conversation) of the group-based communication system. A first user may be associated with the group-based communication channel and may have access to the new message within the group-based communication channel. The computing device 605 may use a machine learning model to determine whether to mark the new message for later specifically for the first user (e.g., within a user interface accessed by the first user). A second user may have authored the new message. In some cases, the first user and the second user may be the same (e.g., the computing device 605 may determine whether to save the message for later for the user who posted the message). In other cases, the first user and the second user may be different.

At 620, the computing device 605 may input one or more features associated with the new message, the group-based communication channel, the first user, the second user, or a combination thereof into a machine learning model. The one or more features may include a semantic embedding of the new message, a first graphical embedding for the first user, a second graphical embedding for the second user, a third graphical embedding for the group-based communication channel, contents of the new message, relationship data for the first user and the second user, first interaction data for the first user with the group-based communication channel, second interaction data for a set of other users with the new message, historical data for the first user, group structure information for a group associated with the group-based communication channel, or any combination thereof.

At 625, the computing device 605 may determine an output of the machine learning model in response to the inputted features. The output may indicate whether to mark the new message for later for the first user.

In some examples, at 630, the computing device 605 may send, for display in the user interface of the user device 610, a suggestion to mark the new message for later. At 635, the user may either select to mark the new message for later based on the suggestion or may refrain from marking the new message for later. Based on the user's selection, the computing device 605 may receive, via the user interface of the user device 610, an input either approving the suggestion or declining the suggestion. In some examples, at 640, the computing device 605 may update the machine learning model based on whether the user approved or declined the suggestion. For example, the user's input may be fed back to the machine learning model for further training.

At 645, the computing device 605 may send, for display in the user interface of the user device 610 operated by the first user, an indication marking the new message for later based on the output of the machine learning model. In some examples, the computing device 605 may send the indication marking the new message for later further based on the user approving the suggestion to mark the new message for later. At 650, the user device 610 may display the new message marked for later. For example, the user device 610 may display the new message with an updated format or scheme to indicate that the message is saved for later. The computing device 605 may additionally, or alternatively, add the new message to a set of messages marked for later for the first user. If the first user selects to view a later user view; the user device 610 may display the set of messages marked for later for the first user, including the new message. For example, the computing device 605 may receive, via a sidebar of the user interface of the user device 610, an input indicating selection of a later tab for the group-based communication system. The computing device 605 may send, for display in a main or central pane of the user interface of the user device 610 and in response to the selection of the later tab, the set of messages marked for later for the first user, including the new message.

In some examples, the machine learning model may indicate to mark the new message for later for the first user, but may indicate to not mark the new message for later for another user (e.g., a third user) based on user-specific features for the other user. The group-based communication system, or another system (e.g., a system supporting machine learning processes), may train the machine learning model using first data and second data. The first data may include prior messages marked for later by one or more users. The second data may include text data, user data, channel data, or any combination thereof associated with the prior messages marked for later. The model training may involve learning relationships between the first data and the second data, such that the machine learning model is trained to output an indication of whether to mark the new message for later upon input of the one or more features. Upon initial deployment and activation of the machine learning model or an update to the machine learning model, the computing device 605 may retrieve, from a set of messages associated with the first user in the group-based communication system, a first subset of messages associated with the first user, for example, based on a filter criterion. The computing device 605 may determine, based on the first subset of messages and using the machine learning model, a second subset of the first subset of messages to mark for later for the first user. Such a process may reduce the initial processing overhead associated with activating the machine learning model.

Figure 7:
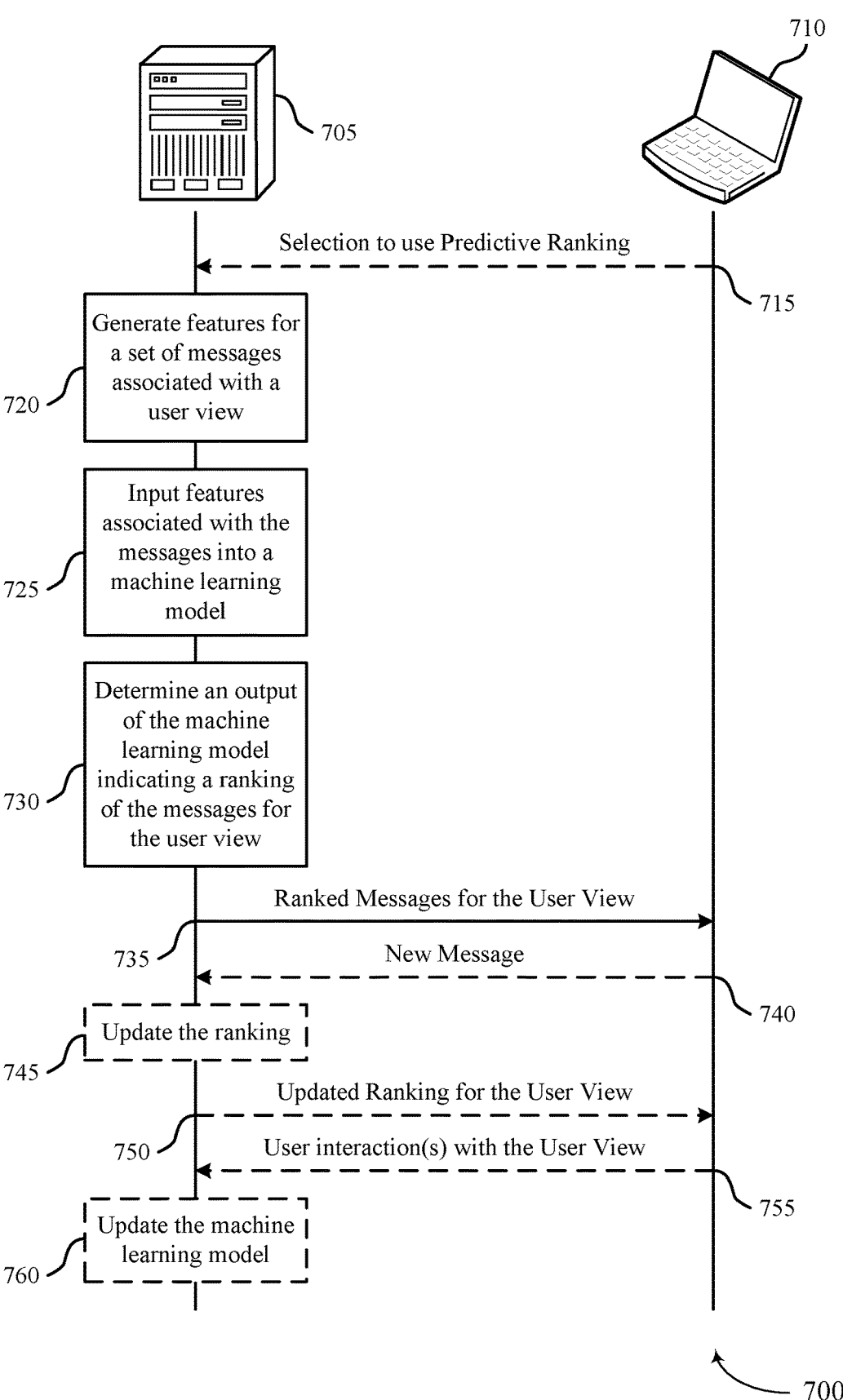

FIG. 7 illustrates an example of a process flow 700 that supports ranking messages in a group-based communication system using machine learning techniques in accordance with aspects of the present disclosure. The process flow 700 may be implemented by a group-based communication system including one or more computing devices 705 and one or more user devices 710. The computing device 705 (e.g., a processing device or system) may host a group-based communication platform. The computing device 705 may be an example of an application server, a database server, a cloud-based server or service, a worker server, a server cluster, a virtual machine, a container, a network device, a user device, or any combination of these or other computing devices or systems. The user device 710 may access the group-based communication platform over a network, based on downloading an application, or both. The user device 710 may be an example of a laptop, desktop computer, mobile device, smartphone, smartwatch, tablet, VR device, or any combination thereof. The user device 710 may include a user interface (e.g., GUI) that can present information (e.g., visually, audibly) corresponding to the group-based communication system, as described herein with reference to FIGS. 1 through 5B. Alternative examples of the following may be implemented, where some processes are performed in a different order than described or are not performed at all. In some examples, processes may include additional features not mentioned below, or further processes may be added. Additionally, or alternatively, one or more operations described herein as performed by the computing device 705 may instead be performed by the user device 710, for example, if the user device 710 runs a group-based communication platform application locally.

The computing device 705, the user device 710, or both may run the group-based communication system platform. A user device 710 may display, via a user interface, one or more visual panes including information relating to the group-based communication platform, as described herein with reference to FIG. 2.

In some examples, at 715, a user operating the user device 710 may select to order messages (e.g., group-based communication messages, reminders, files) according to a predictive ranking from a machine learning model. For example, the computing device 705 may receive, via the user interface of the user device 710, a first input indicating a first selection to order the messages associated with a user view according to the predictive ranking. Alternative options may include ordering the messages according to a timestamp order (e.g., creation time, due date) or a filename order.

At 720, the computing device 705 may generate sets of features corresponding to one or more messages associated with the user view for the group-based communication system. Each set of features may correspond to a respective message of the one or more messages, and the user view may be associated with a user of the group-based communication system (e.g., the user operating the user device 710). The set of features may include a first graphical embedding for the user, a second graphical embedding for the user view; contents of the respective message, first interaction data for the user with the user view, second interaction data for a plurality of other users with the respective message, historical data for the user, or any combination thereof.

At 725, the computing device 705 may input the sets of features into a machine learning model trained to rank the messages for the user view. In some cases, the computing device 705 may use the machine learning model based on the user selection received at 715. In some examples, the machine learning model may be an example of a gradient-boosted tree model. The computing device 705 may use different machine learning models or a same machine learning model for ranking messages within different user views. For example, the user views may include a first view of messages saved for later by the user, a second view of draft messages for the user, a third view of updated threads associated with the user in the group-based communication system, a fourth view of files stored for the user in the group-based communication system, or any combination thereof.

At 730, the computing device 705 may determine an output of the machine learning model in response to the inputted sets of features. The output of the machine learning model may indicate a ranking of the messages for the user view.

At 735, the computing device 705 may send, to the user device 710 operated by the user and for display in the user view, an indication of the ranking of the messages. The indication of the ranking may support rendering the messages via the user interface of the user device 710 in accordance with the ranking.

In some examples, at 740, the computing device 705 may receive (e.g., from the user device 710 or another user device (not shown)) a new message to add to the user view for the group-based communication system. The computing device 705 may generate a new set of features corresponding to the new message. At 745, the computing device 705 may update the ranking of the messages based on the new message and using the machine learning model. In some examples, the computing device 705 may input the sets of features for all of the messages in the user view (e.g., including the new features for the new message) into the machine learning model to determine the updated ranking. In some other examples, the computing device 705 may input the new features for the new message into the machine learning model to determine a ranking for the message within the set of messages for the user view. At 750, the computing device 705 may send, to the user device 710 and for display in the user view, an indication of the updated ranking of the messages.

In some examples, at 755, the computing device 705 may receive interaction data for the messages associated with the user view. In some cases, the interaction data may involve the user replying to messages, reacting to messages, clicking message links, completing messages, or any combination thereof. Additionally, or alternatively, the interaction data may include the user reordering the messages within the user view. At 760, the computing device 705 may update the machine learning model (e.g., further train the model) based on the interaction data.

Figure 8:
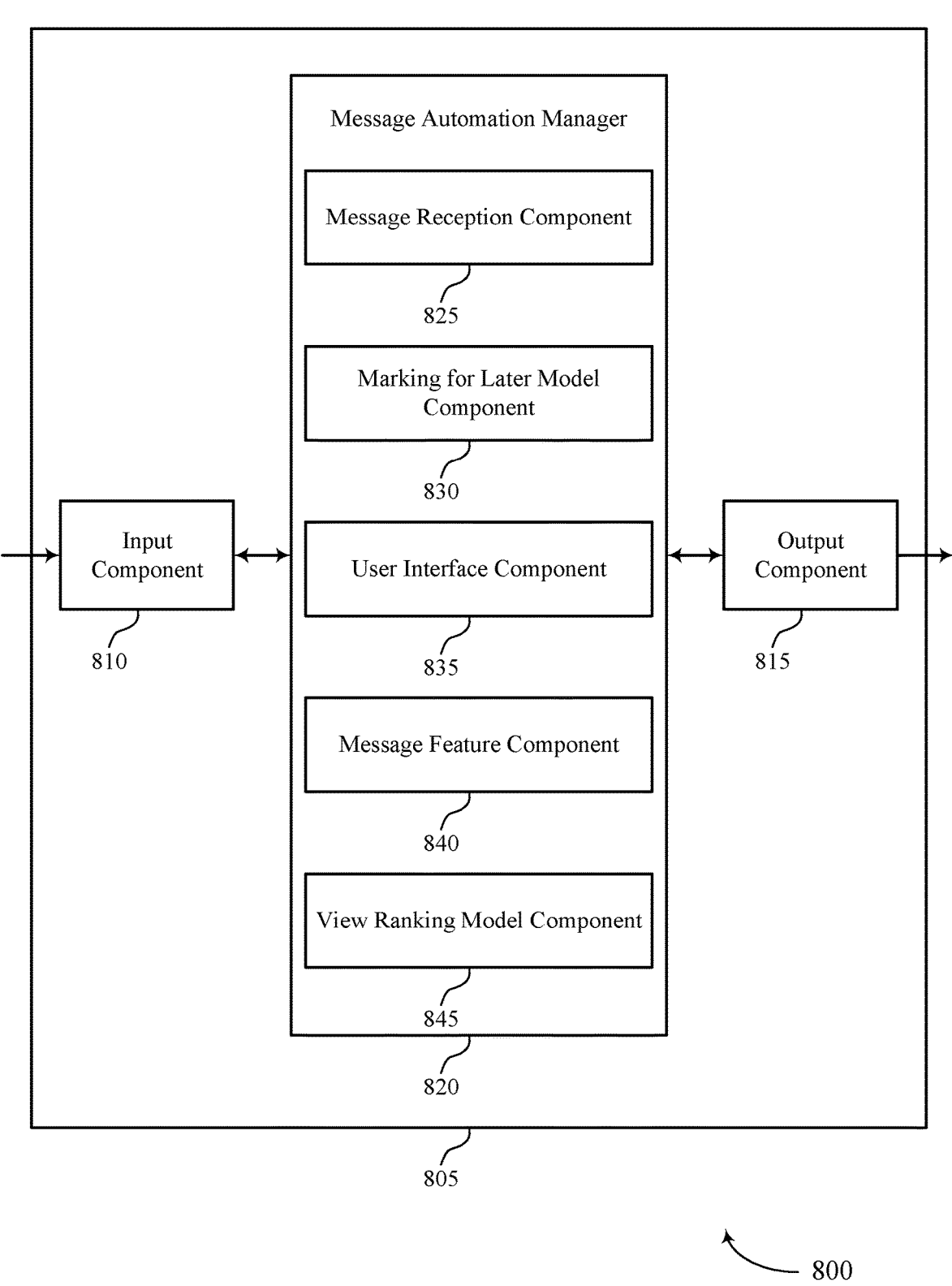
FIG. 8 illustrates a block diagram of a device that supports ranking and marking messages in a group-based communication system using machine learning techniques in accordance with aspects of the present disclosure.

FIG. 8 illustrates a block diagram 800 of a device 805 that supports ranking and marking messages in a group-based communication system using machine learning techniques in accordance with aspects of the present disclosure. The device 805 may include an input component 810, an output component 815, and a message automation manager 820. The device 805 may also include a processor. Each of these components may be in communication with one another (e.g., via one or more buses).

The input component 810 may manage input signals for the device 805. For example, the input component 810 may identify input signals based on an interaction with a modem, a keyboard, a mouse, a touchscreen, or a similar device. These input signals may be associated with user input or processing at other components or devices. In some cases, the input component 810 may utilize an operating system such as iOS®, ANDROID®, MS-DOS®, MS-WINDOWS®, OS/2®, UNIX®, LINUX®, or another known operating system to handle input signals. The input component 810 may send aspects of these input signals to other components of the device 805 for processing. For example, the input component 810 may transmit input signals to the message automation manager 820 to support ranking and marking messages in a group-based communication system using machine learning techniques. In some cases, the input component 810 may be a component of an input/output (I/O) controller 1010 as described with reference to FIG. 10.

The output component 815 may manage output signals for the device 805. For example, the output component 815 may receive signals from other components of the device 805, such as the message automation manager 820, and may transmit these signals to other components or devices. In some examples, the output component 815 may transmit output signals for display in a user interface, for storage in a database or data store, for further processing at a server or server cluster, or for any other processes at any number of devices or systems. In some cases, the output component 815 may be a component of an I/O controller 1010 as described with reference to FIG. 10.

The message automation manager 820 may include a message reception component 825, a marking for later model component 830, a user interface component 835, a message feature component 840, a view ranking model component 845, or any combination thereof. In some examples, the message automation manager 820, or various components thereof, may be configured to perform various operations (e.g., receiving, monitoring, transmitting) using or otherwise in cooperation with the input component 810, the output component 815, or both. For example, the message automation manager 820 may receive information from the input component 810, send information to the output component 815, or be integrated in combination with the input component 810, the output component 815, or both to receive information, transmit information, or perform various other operations as described herein.

The message automation manager 820 may support automatically marking messages in a group-based communication system for later in accordance with examples as disclosed herein. The message reception component 825 may be configured to support receiving a new message posted to a group-based communication channel of the group-based communication system, where a first user is associated with the group-based communication channel and a user (e.g., a second user, the same user as the first user or a different user than the first user) authored the new message. The marking for later model component 830 may be configured to support inputting one or more features associated with the new message, the group-based communication channel, the first user, the second user, or a combination thereof into a machine learning model, the one or more features including at least a semantic embedding of the new message. The marking for later model component 830 may be configured to support determining, in response to the inputting the one or more features into the machine learning model, an output of the machine learning model indicating to mark the new message for later for the first user. The user interface component 835 may be configured to support sending, for display in a user interface of a user device operated by the first user, an indication marking the new message for later based on the output of the machine learning model.

Additionally, or alternatively, the message automation manager 820 may support automatically ranking messages for a group-based communication system in accordance with examples as disclosed herein. The message feature component 840) may be configured to support generating multiple sets of features corresponding to multiple messages associated with a user view for the group-based communication system, a set of features of the multiple sets of features corresponding to a respective message of the multiple messages, and the user view associated with a user of the group-based communication system. The view ranking model component 845 may be configured to support inputting the multiple sets of features into a machine learning model trained to rank the multiple messages for the user view. The view ranking model component 845 may be configured to support determining, in response to the inputting the multiple sets of features into the machine learning model, an output of the machine learning model indicating a ranking of the multiple messages for the user view. The user interface component 835 may be configured to support sending, to a user device operated by the user and displaying the user view, an indication of the ranking of the multiple messages for rendering the multiple messages via a user interface of the user device in accordance with the ranking.

Figure 9:
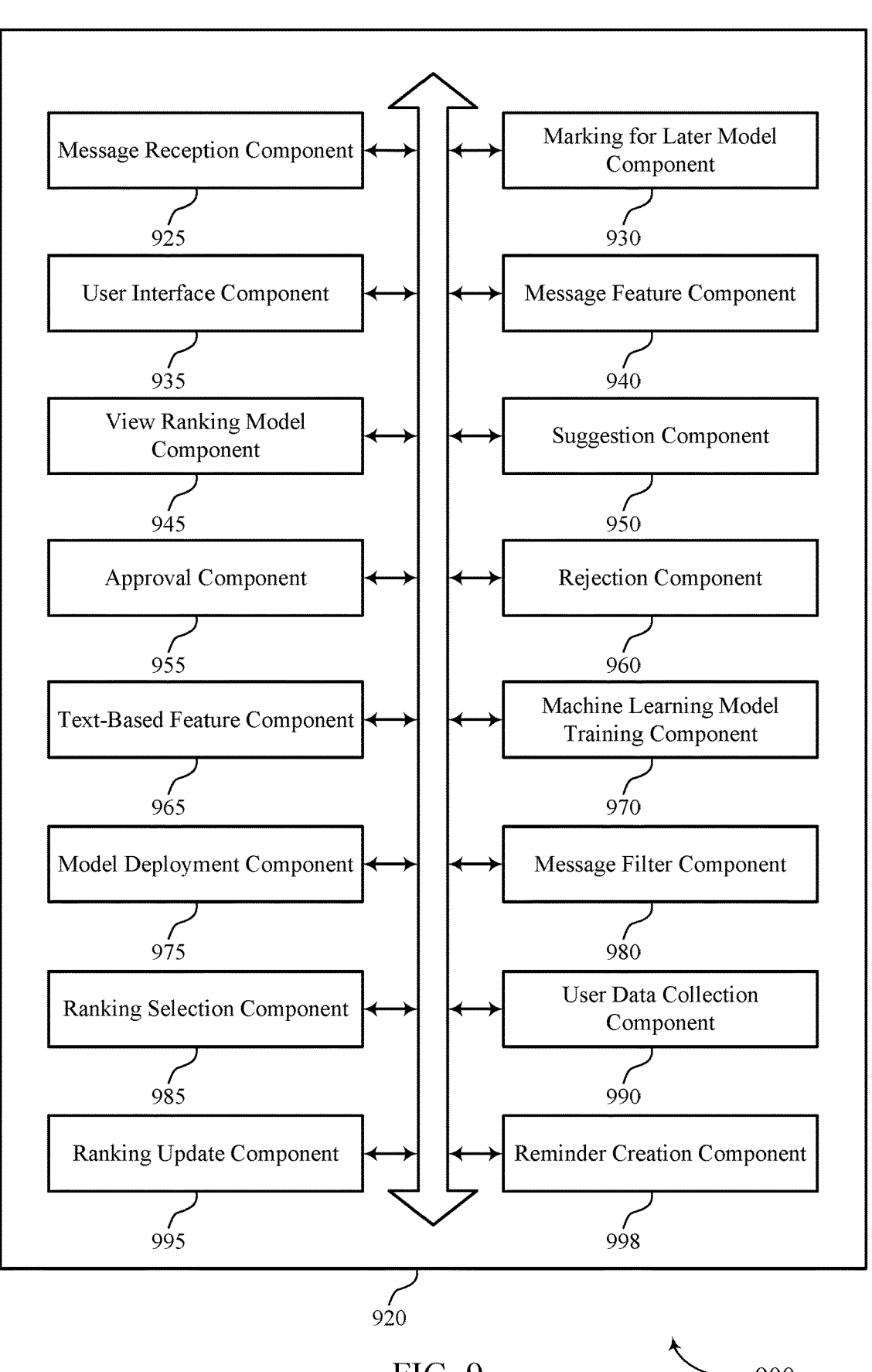
FIG. 9 illustrates a block diagram of a message automation manager that supports ranking and marking messages in a group-based communication system using machine learning techniques in accordance with aspects of the present disclosure.

FIG. 9 illustrates a block diagram 900 of a message automation manager 920 that supports ranking and marking messages in a group-based communication system using machine learning techniques in accordance with aspects of the present disclosure. The message automation manager 920 may be an example of aspects of a message automation manager 820), as described herein. The message automation manager 920, or various components thereof, may be an example of means for performing various aspects of ranking and marking messages in a group-based communication system using machine learning techniques as described herein. For example, the message automation manager 920 may include a message reception component 925, a marking for later model component 930, a user interface component 935, a message feature component 940, a view ranking model component 945, a suggestion component 950, an approval component 955, a rejection component 960, a text-based feature component 965, a machine learning model training component 970, a model deployment component 975, a message filter component 980), a ranking selection component 985, a user data collection component 990, a ranking update component 995, a reminder creation component 998, or any combination thereof. Each of these components may communicate, directly or indirectly, with one another (e.g., via one or more buses).

The message automation manager 920 may support automatically marking messages in a group-based communication system for later in accordance with examples as disclosed herein. The message reception component 925 may be configured to support receiving a new message posted to a group-based communication channel of the group-based communication system, where a first user is associated with the group-based communication channel and a second user authored the new message. The marking for later model component 930 may be configured to support inputting one or more features associated with the new message, the group-based communication channel, the first user, the second user, or a combination thereof into a machine learning model, the one or more features including at least a semantic embedding of the new message. In some examples, the marking for later model component 930 may be configured to support determining, in response to the inputting the one or more features into the machine learning model, an output of the machine learning model indicating to mark the new message for later for the first user. The user interface component 935 may be configured to support sending, for display in a user interface of a user device operated by the first user, an indication marking the new message for later based on the output of the machine learning model.

In some examples, to support sending the indication marking the new message for later, the suggestion component 950 may be configured to support sending, for display in the user interface of the user device, a suggestion to mark the new message for later. In some such examples, the approval component 955 may be configured to support receiving, via the user interface of the user device, an input approving the suggestion. In some examples, the approval component 955 may be configured to support adding the new message to a set of multiple messages marked for later for the first user in response to the input approving the suggestion. In some such examples, the machine learning model training component 970 may be configured to support updating the machine learning model based on the input approving the suggestion.

In some examples, to support sending the indication marking the new message for later, the suggestion component 950 may be configured to support sending, for display in the user interface of the user device, a suggestion to mark the new message for later. In some such examples, the rejection component 960 may be configured to support receiving, via the user interface of the user device, an input declining the suggestion. In some examples, the rejection component 960 may be configured to support refraining from adding the new message to a set of multiple messages marked for later for the first user in response to the input declining the suggestion. In some such examples, the machine learning model training component 970 may be configured to support updating the machine learning model based on the input declining the suggestion.

In some examples, a third user is associated with the group-based communication channel, and the marking for later model component 930 may be configured to support inputting one or more second features associated with the new message, the group-based communication channel, the third user, the second user, or a combination thereof into the machine learning model, the one or more second features including at least the semantic embedding of the new message. In some examples, the marking for later model component 930 may be configured to support determining, in response to the inputting the one or more second features into the machine learning model, a second output of the machine learning model indicating not to mark the new message for later for the third user.

In some examples, the user interface component 935 may be configured to support receiving, via a sidebar of the user interface of the user device, an input indicating selection of a later tab for the group-based communication system. In some examples, the user interface component 935 may be configured to support sending, for display in a main pane of the user interface of the user device and in response to the input, a set of multiple messages marked for later for the first user, the set of multiple messages marked for later including at least the new message.

In some examples, the text-based feature component 965 may be configured to support generating a feature of the one or more features indicating that the new message includes text corresponding to a date, a time, or both, where the output of the machine learning model indicating to mark the new message for later for the first user is based on the new message including the text corresponding to the date, the time, or both. In some examples, the reminder creation component 998 may be configured to support automatically creating a reminder for the first user in the group-based communication system based on the new message including the text corresponding to the date, the time, or both, where a trigger time (e.g., a due date) for the reminder is based on the date, the time, or both.

In some examples, the machine learning model may be trained based on first data that includes prior messages marked for later by a set of multiple users. In some examples, the machine learning model may be further trained based on second data that includes text data, user data, channel data, or any combination thereof associated with the prior messages marked for later, to learn relationships between the first and the second data, such that the machine learning model is trained to output an indication of whether to mark the new message for later upon input of the one or more features.

In some examples, the machine learning model corresponds to a first group of the group-based communication system, the first group including at least the first user and the second user. In some examples, a second machine learning model different from the machine learning model is trained, the second machine learning model corresponding to a second group of the group-based communication system, and the second machine learning model trained to output a second indication of whether to mark new messages for later for users of the second group.

In some examples, the model deployment component 975 may be configured to support deploying the machine learning model for the group-based communication system. In some examples, the message filter component 980 may be configured to support retrieving, from a set of multiple messages associated with the first user in the group-based communication system, a first subset of the set of multiple messages associated with the first user based on a filter criterion. In some examples, the message filter component 980 may be configured to support determining, based on the first subset of the set of multiple messages associated with the first user and the machine learning model, a second subset of the first subset of the set of multiple messages to mark for later for the first user.

In some examples, the one or more features further include a first graphical embedding for the first user, a second graphical embedding for the second user, a third graphical embedding for the group-based communication channel, contents of the new message, relationship data for the first user and the second user, first interaction data for the first user with the group-based communication channel, second interaction data for a set of multiple other users with the new message, historical data for the first user, group structure information for a group associated with the group-based communication channel, or any combination thereof.

Additionally, or alternatively, the message automation manager 920 may support automatically ranking messages for a group-based communication system in accordance with examples as disclosed herein. The message feature component 940 may be configured to support generating multiple sets of features corresponding to multiple messages associated with a user view for the group-based communication system, a set of features of the multiple sets of features corresponding to a respective message of the multiple messages, and the user view associated with a user of the group-based communication system. The view ranking model component 945 may be configured to support inputting the multiple sets of features into a machine learning model trained to rank the multiple messages for the user view. In some examples, the view ranking model component 945 may be configured to support determining, in response to the inputting the multiple sets of features into the machine learning model, an output of the machine learning model indicating a ranking of the multiple messages for the user view. In some examples, the user interface component 935 may be configured to support sending, to a user device operated by the user and displaying the user view; an indication of the ranking of the multiple messages for rendering the multiple messages via a user interface of the user device in accordance with the ranking.

In some examples, the ranking selection component 985 may be configured to support receiving, via the user interface of the user device, a first input indicating a first selection to order the multiple messages associated with the user view according to a predictive ranking, where the indication of the ranking of the multiple messages is sent based on the first input. In some other examples, the ranking selection component 985 may be configured to support receiving, via the user interface of the user device, a second input indicating a second selection to order the multiple messages associated with the user view according to a timestamp order or a filename order. In some examples, the user interface component 935 may be configured to support sending, to the user device operated by the user and displaying the user view, an indication of an order of the multiple messages for rendering the multiple messages via the user interface of the user device in accordance with the order based on the second input.

In some examples, the message reception component 925 may be configured to support receiving a new message to add to the user view for the group-based communication system. In some examples, the message feature component 940 may be configured to support generating a new set of features corresponding to the new message. In some examples, the view ranking model component 945 may be configured to support inputting the multiple sets of features and the new set of features into the machine learning model. In some examples, the view ranking model component 945 may be configured to support determining, in response to the inputting the multiple sets of features and the new set of features into the machine learning model, a second output of the machine learning model indicating a second ranking of the multiple messages and the new message for the user view.

In some other examples, the message reception component 925 may be configured to support receiving a new message to add to the user view for the group-based communication system. In some examples, the message feature component 940 may be configured to support generating a new set of features corresponding to the new message. In some examples, the view ranking model component 945 may be configured to support inputting the new set of features into the machine learning model. In some examples, the view ranking model component 945 may be configured to support determining, in response to the inputting the new set of features into the machine learning model, a second ranking of the multiple messages and the new message for the user view based on a second output of the machine learning model indicating a rank position for the new message relative to the multiple messages for the user view.

In some examples, the user data collection component 990 may be configured to support receiving interaction data for the multiple messages associated with the user view and corresponding to the user. In some examples, the machine learning model training component 970 may be configured to support updating the machine learning model based on the interaction data.

In some examples, the ranking update component 995 may be configured to support receiving, via the user interface of the user device, an input reordering the multiple messages in the user view for the user. In some examples, the machine learning model training component 970 may be configured to support updating the machine learning model based on the reordering of the multiple messages in the user view for the user.

In some examples, the user view corresponds to a first view of messages saved for later by the user, a second view of draft messages for the user, a third view of updated threads associated with the user in the group-based communication system, a fourth view of files stored for the user in the group-based communication system, or any combination thereof. In some examples, a set of multiple machine learning models is trained to rank messages for a set of multiple user views.

In some examples, the set of features includes a first graphical embedding for the user, a second graphical embedding for the user view; contents of the respective message, first interaction data for the user with the user view, second interaction data for a set of multiple other users with the respective message, historical data for the user, or any combination thereof. In some examples, the machine learning model includes a gradient-boosted tree model.

Figure 10:
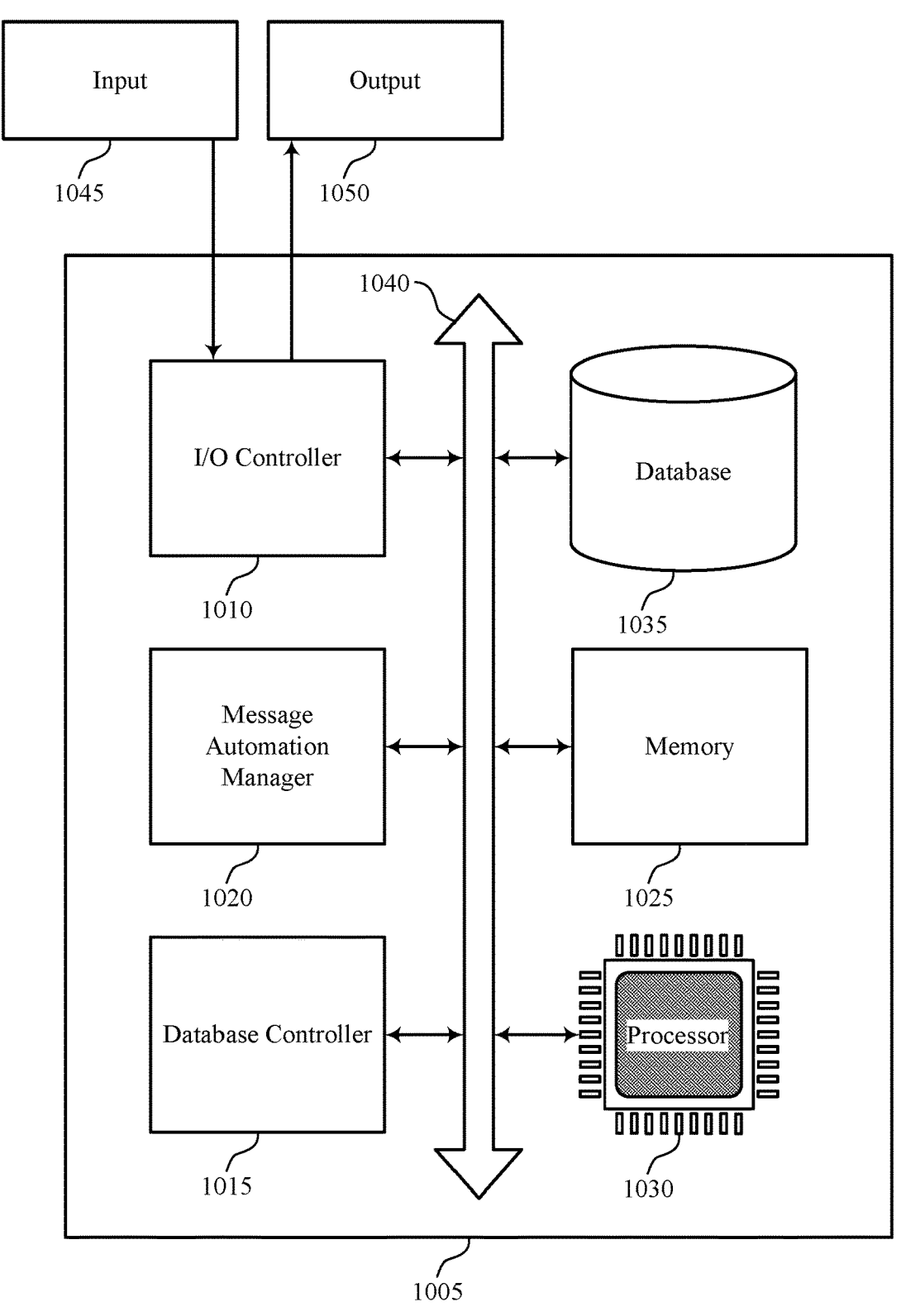
FIG. 10 illustrates a diagram of a system including a device that supports ranking and marking messages in a group-based communication system using machine learning techniques in accordance with aspects of the present disclosure.

FIG. 10 illustrates a diagram of a system 1000 including a device 1005 that supports ranking and marking messages in a group-based communication system using machine learning techniques in accordance with aspects of the present disclosure. The device 1005 may be an example of or include the components of a device 805 as described herein. The device 1005 may include components for bi-directional data communications including components for transmitting and receiving communications, such as a message automation manager 1020, an I/O controller 1010, a database controller 1015, a memory 1025, a processor 1030, and a database 1035. These components may be in electronic communication or otherwise coupled (e.g., operatively, communicatively, functionally, electronically, electrically) via one or more buses (e.g., a bus 1040).

The I/O controller 1010 may manage input signals 1045 and output signals 1050 for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In other cases, the I/O controller 1010 may represent or interact with a modem, a keyboard, a mouse, a touchscreen, or a similar device. In some cases, the I/O controller 1010 may be implemented as part of a processor 1030. In some examples, a user may interact with the device 1005 via the I/O controller 1010 or via hardware components controlled by the I/O controller 1010.

The database controller 1015 may manage data storage and processing in a database 1035. In some cases, a user may interact with the database controller 1015. In other cases, the database controller 1015 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor 1030 to perform various functions described herein. In some cases, the memory 1025 may contain, among other things, a basic I/O system (BIOS) which may control basic hardware or software operation such as the interaction with peripheral components or devices.

The processor 1030 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting ranking and marking messages in a group-based communication system using machine learning techniques).

The message automation manager 1020 may support automatically marking messages in a group-based communication system for later in accordance with examples as disclosed herein. For example, the message automation manager 1020 may be configured to support receiving a new message posted to a group-based communication channel of the group-based communication system, where a first user is associated with the group-based communication channel and a second user authored the new message. The message automation manager 1020 may be configured to support inputting one or more features associated with the new message, the group-based communication channel, the first user, the second user, or a combination thereof into a machine learning model, the one or more features including at least a semantic embedding of the new message. The message automation manager 1020 may be configured to support determining, in response to the inputting the one or more features into the machine learning model, an output of the machine learning model indicating to mark the new message for later for the first user. The message automation manager 1020 may be configured to support sending, for display in a user interface of a user device operated by the first user, an indication marking the new message for later based on the output of the machine learning model.

Additionally, or alternatively, the message automation manager 1020 may support automatically ranking messages for a group-based communication system in accordance with examples as disclosed herein. For example, the message automation manager 1020 may be configured to support generating multiple sets of features corresponding to multiple messages associated with a user view for the group-based communication system, a set of features of the multiple sets of features corresponding to a respective message of the multiple messages, and the user view associated with a user of the group-based communication system. The message automation manager 1020 may be configured to support inputting the multiple sets of features into a machine learning model trained to rank the multiple messages for the user view. The message automation manager 1020 may be configured to support determining, in response to the inputting the multiple sets of features into the machine learning model, an output of the machine learning model indicating a ranking of the multiple messages for the user view. The message automation manager 1020 may be configured to support sending, to a user device operated by the user and displaying the user view; an indication of the ranking of the multiple messages for rendering the multiple messages via a user interface of the user device in accordance with the ranking.

Figure 11:
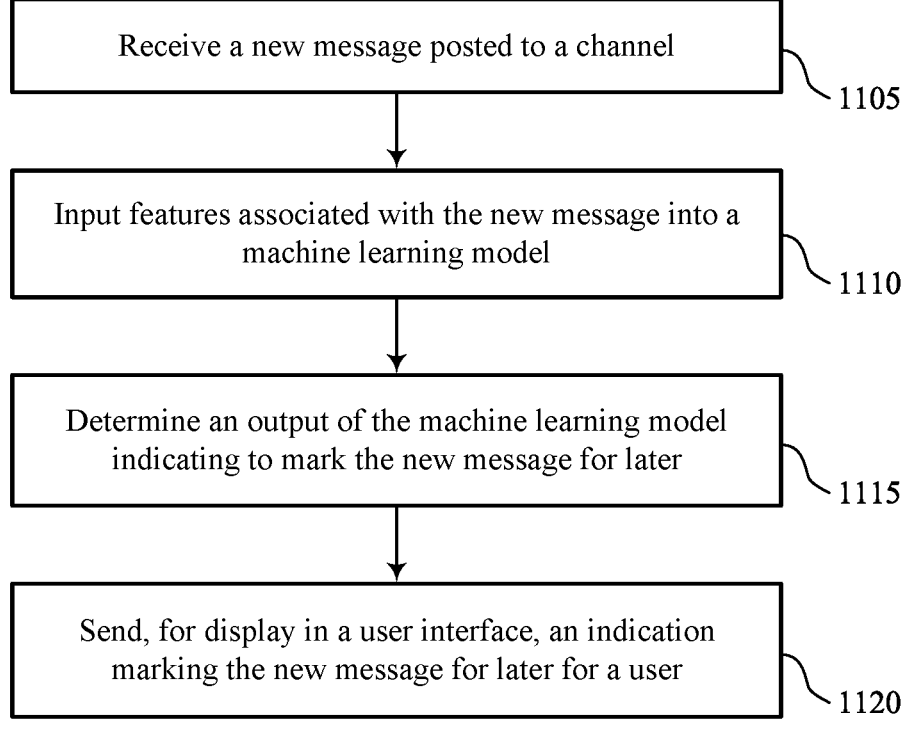
FIGS. 11 and 12 illustrate flowcharts showing methods that support ranking and marking messages in a group-based communication system using machine learning techniques in accordance with aspects of the present disclosure.

FIG. 11 illustrates a flowchart showing a method 1100 that supports ranking and marking messages in a group-based communication system using machine learning techniques in accordance with aspects of the present disclosure. The operations of the method 1100 may be implemented by a group-based communication system or its components (e.g., a processing device, such as an application server, a database server, a cloud-based server or service, a worker server, a server cluster, a virtual machine, a container, a network device, a user device, or any combination of these or other computing devices) as described herein. For example, the operations of the method 1100 may be performed by a group-based communication system as described with reference to FIGS. 1 through 10. In some examples, a group-based communication system may execute a set of instructions to control the functional elements of the group-based communication system to perform the described functions. Additionally, or alternatively, the group-based communication system may perform aspects of the described functions using special-purpose hardware.

At 1105, the method may include receiving a new message posted to a group-based communication channel of the group-based communication system. A first user may be associated with the group-based communication channel and a second user may have authored the new message. In some cases, the first user and the second user may be the same. In some other cases, the first user may be different from the second user. The operations of 1105 may be performed in accordance with examples as disclosed herein. In some examples, aspects of the operations of 1105 may be performed by a message reception component 925 as described with reference to FIG. 9.

At 1110, the method may include inputting one or more features into a machine learning model. For example, the one or more features may be associated with the new message, the group-based communication channel, the first user, the second user, or a combination thereof. The one or more features may include at least a semantic embedding of the new message. The operations of 1110 may be performed in accordance with examples as disclosed herein. In some examples, aspects of the operations of 1110 may be performed by a marking for later model component 930 as described with reference to FIG. 9.

At 1115, the method may include determining (e.g., in response to inputting the one or more features into the machine learning model) an output of the machine learning model indicating whether to mark the new message for later for the first user. The operations of 1115 may be performed in accordance with examples as disclosed herein. In some examples, aspects of the operations of 1115 may be performed by a marking for later model component 930 as described with reference to FIG. 9.

At 1120, the method may include sending, for display in a user interface of a user device operated by the first user, an indication marking the new message for later based on the output of the machine learning model. The operations of 1120 may be performed in accordance with examples as disclosed herein. In some examples, aspects of the operations of 1120 may be performed by a user interface component 935 as described with reference to FIG. 9.

Figure 12:
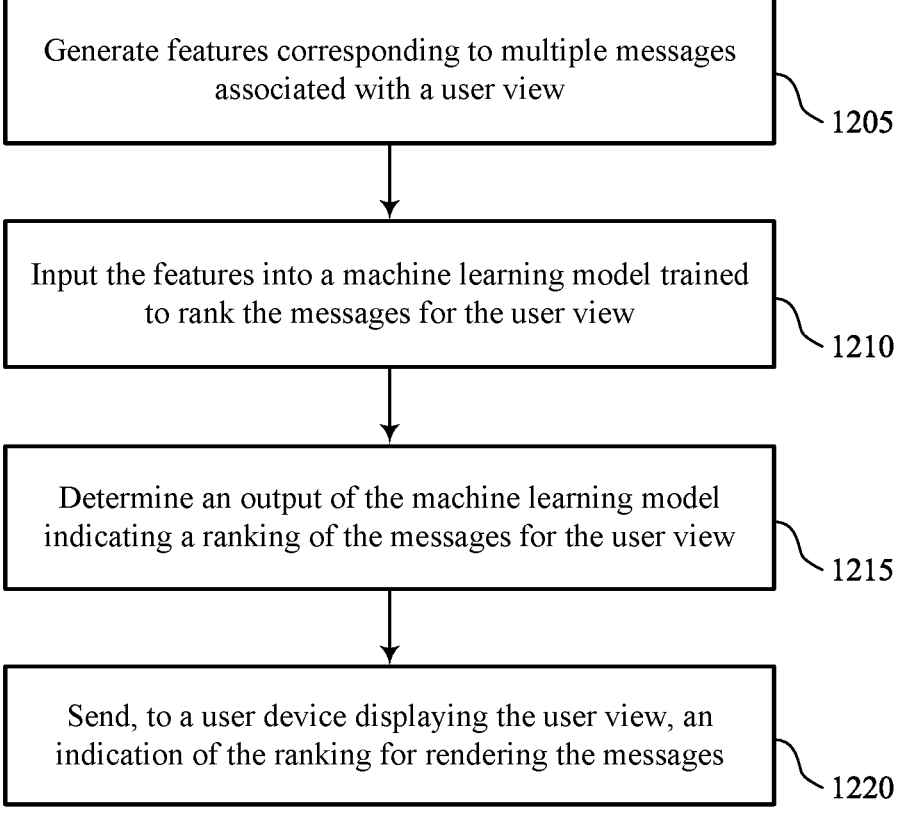

FIG. 12 illustrates a flowchart showing a method 1200 that supports ranking and marking messages in a group-based communication system using machine learning techniques in accordance with aspects of the present disclosure. The operations of the method 1200 may be implemented by a group-based communication system or its components (e.g., a processing device, such as an application server, a database server, a cloud-based server or service, a worker server, a server cluster, a virtual machine, a container, a network device, a user device, or any combination of these or other computing devices) as described herein. For example, the operations of the method 1200 may be performed by a group-based communication system as described with reference to FIGS. 1 through 10. In some examples, a group-based communication system may execute a set of instructions to control the functional elements of the group-based communication system to perform the described functions. Additionally, or alternatively, the group-based communication system may perform aspects of the described functions using special-purpose hardware.

At 1205, the method may include generating multiple sets of features corresponding to a set of multiple messages associated with a user view for the group-based communication system. A set of features of the multiple sets of features may correspond to a respective message of the set of multiple messages. Additionally, or alternatively, the user view may be associated with a user of the group-based communication system. The operations of 1205 may be performed in accordance with examples as disclosed herein. In some examples, aspects of the operations of 1205 may be performed by a message feature component 940 as described with reference to FIG. 9.

At 1210, the method may include inputting the multiple sets of features into a machine learning model trained to rank the set of multiple messages for the user view. The operations of 1210 may be performed in accordance with examples as disclosed herein. In some examples, aspects of the operations of 1210 may be performed by a view ranking model component 945 as described with reference to FIG. 9.

At 1215, the method may include determining (e.g., in response to inputting the multiple sets of features into the machine learning model) an output of the machine learning model indicating a ranking of the set of multiple messages for the user view. The operations of 1215 may be performed in accordance with examples as disclosed herein. In some examples, aspects of the operations of 1215 may be performed by a view ranking model component 945 as described with reference to FIG. 9.

At 1220, the method may include sending, to a user device operated by the user and displaying the user view, an indication of the ranking of the set of multiple messages. The user device may render the set of multiple messages via a user interface of the user device in accordance with the ranking. The operations of 1220 may be performed in accordance with examples as disclosed herein. In some examples, aspects of the operations of 1220 may be performed by a user interface component 935 as described with reference to FIG. 9.

A method for automatically marking messages in a group-based communication system for later is described. The method may include receiving a new message posted to a group-based communication channel of the group-based communication system, where a first user is associated with the group-based communication channel and a second user authored the new message. The method may further include inputting one or more features associated with the new message, the group-based communication channel, the first user, the second user, or a combination thereof into a machine learning model, the one or more features including at least a semantic embedding of the new message. Additionally, the method may include determining, in response to the inputting the one or more features into the machine learning model, an output of the machine learning model indicating to mark the new message for later for the first user and sending, for display in a user interface of a user device operated by the first user, an indication marking the new message for later based on the output of the machine learning model.

An apparatus for automatically marking messages in a group-based communication system for later is described. The apparatus may include a processor, memory coupled with the processor, and instructions stored in the memory. The instructions may be executable by the processor to cause the apparatus to receive a new message posted to a group-based communication channel of the group-based communication system, where a first user is associated with the group-based communication channel and a second user authored the new message. The instructions may be further executable by the processor to cause the apparatus to input one or more features associated with the new message, the group-based communication channel, the first user, the second user, or a combination thereof into a machine learning model, the one or more features including at least a semantic embedding of the new message. Additionally, the instructions may be executable by the processor to cause the apparatus to determine, in response to the inputting the one or more features into the machine learning model, an output of the machine learning model indicating to mark the new message for later for the first user and send, for display in a user interface of a user device operated by the first user, an indication marking the new message for later based on the output of the machine learning model.

Another apparatus for automatically marking messages in a group-based communication system for later is described. The apparatus may include means for receiving a new message posted to a group-based communication channel of the group-based communication system, where a first user is associated with the group-based communication channel and a second user authored the new message. The apparatus may further include means for inputting one or more features associated with the new message, the group-based communication channel, the first user, the second user, or a combination thereof into a machine learning model, the one or more features including at least a semantic embedding of the new message. Additionally, the apparatus may include means for determining, in response to the inputting the one or more features into the machine learning model, an output of the machine learning model indicating to mark the new message for later for the first user and means for sending, for display in a user interface of a user device operated by the first user, an indication marking the new message for later based on the output of the machine learning model.

A non-transitory computer-readable medium storing code for automatically marking messages in a group-based communication system for later is described. The code may include instructions executable by a processor to receive a new message posted to a group-based communication channel of the group-based communication system, where a first user is associated with the group-based communication channel and a second user authored the new message. The code may further include instructions executable by a processor to input one or more features associated with the new message, the group-based communication channel, the first user, the second user, or a combination thereof into a machine learning model, the one or more features including at least a semantic embedding of the new message. Additionally, the code may include instructions executable by a processor to determine, in response to the inputting the one or more features into the machine learning model, an output of the machine learning model indicating to mark the new message for later for the first user and send, for display in a user interface of a user device operated by the first user, an indication marking the new message for later based on the output of the machine learning model.

In some examples of the method, apparatuses, and non-transitory computer-readable medium described herein, sending the indication marking the new message for later may include operations, features, means, or instructions for sending, for display in the user interface of the user device, a suggestion to mark the new message for later, receiving, via the user interface of the user device, an input approving the suggestion, and adding the new message to a set of multiple messages marked for later for the first user in response to the input approving the suggestion. Some examples of the method, apparatuses, and non-transitory computer-readable medium described herein may further include operations, features, means, or instructions for updating the machine learning model based on the input approving the suggestion.

In some other examples of the method, apparatuses, and non-transitory computer-readable medium described herein, sending the indication marking the new message for later may include operations, features, means, or instructions for sending, for display in the user interface of the user device, a suggestion to mark the new message for later, receiving, via the user interface of the user device, an input declining the suggestion, and refraining from adding the new message to a set of multiple messages marked for later for the first user in response to the input declining the suggestion. Some examples of the method, apparatuses, and non-transitory computer-readable medium described herein may further include operations, features, means, or instructions for updating the machine learning model based on the input declining the suggestion.

In some examples of the method, apparatuses, and non-transitory computer-readable medium described herein, a third user may be associated with the group-based communication channel and the method, apparatuses, and non-transitory computer-readable medium may include further operations, features, means, or instructions for inputting one or more second features associated with the new message, the group-based communication channel, the third user, the second user, or a combination thereof into the machine learning model, the one or more second features including at least the semantic embedding of the new message, and determining, in response to the inputting the one or more second features into the machine learning model, a second output of the machine learning model indicating not to mark the new message for later for the third user.

Some examples of the method, apparatuses, and non-transitory computer-readable medium described herein may further include operations, features, means, or instructions for receiving, via a sidebar of the user interface of the user device, an input indicating selection of a later tab for the group-based communication system and sending, for display in a main pane of the user interface of the user device and in response to the input, a set of multiple messages marked for later for the first user, the set of multiple messages marked for later including at least the new message.

Some examples of the method, apparatuses, and non-transitory computer-readable medium described herein may further include operations, features, means, or instructions for generating a feature of the one or more features indicating that the new message includes text corresponding to a date, a time, or both, where the output of the machine learning model indicating to mark the new message for later for the first user may be based on the new message including the text corresponding to the date, the time, or both. In some examples of the method, apparatuses, and non-transitory computer-readable medium described herein, automatically creating a reminder for the first user in the group-based communication system based on the new message including the text corresponding to the date, the time, or both, where a trigger time for the reminder may be based on the date, the time, or both.

In some examples of the method, apparatuses, and non-transitory computer-readable medium described herein, the machine learning model may be trained based on first data that includes prior messages marked for later by a set of multiple users and second data that includes text data, user data, channel data, or any combination thereof associated with the prior messages marked for later, to learn relationships between the first and the second data, such that the machine learning model may be trained to output an indication of whether to mark the new message for later upon input of the one or more features.

In some examples of the method, apparatuses, and non-transitory computer-readable medium described herein, the machine learning model corresponds to a first group of the group-based communication system, the first group including at least the first user and the second user. In some examples of the method, apparatuses, and non-transitory computer-readable medium described herein, a second machine learning model different from the machine learning model may be trained, the second machine learning model corresponding to a second group of the group-based communication system, and the second machine learning model trained to output a second indication of whether to mark new messages for later for users of the second group.

Some examples of the method, apparatuses, and non-transitory computer-readable medium described herein may further include operations, features, means, or instructions for deploying the machine learning model for the group-based communication system, retrieving, from a set of multiple messages associated with the first user in the group-based communication system, a first subset of the set of multiple messages associated with the first user based on a filter criterion, and determining, based on the first subset of the set of multiple messages associated with the first user and the machine learning model, a second subset of the first subset of the set of multiple messages to mark for later for the first user.

In some examples of the method, apparatuses, and non-transitory computer-readable medium described herein, the one or more features further include a first graphical embedding for the first user, a second graphical embedding for the second user, a third graphical embedding for the group-based communication channel, contents of the new message, relationship data for the first user and the second user, first interaction data for the first user with the group-based communication channel, second interaction data for a set of multiple other users with the new message, historical data for the first user, group structure information for a group associated with the group-based communication channel, or any combination thereof.

Another method for automatically ranking messages for a group-based communication system is described. The method may include generating multiple sets of features corresponding to a set of multiple messages associated with a user view for the group-based communication system, a set of features of the multiple sets of features corresponding to a respective message of the set of multiple messages, and the user view associated with a user of the group-based communication system. The method may further include inputting the multiple sets of features into a machine learning model trained to rank the set of multiple messages for the user view; determining, in response to the inputting the multiple sets of features into the machine learning model, an output of the machine learning model indicating a ranking of the set of multiple messages for the user view, and sending, to a user device operated by the user and displaying the user view, an indication of the ranking of the set of multiple messages for rendering the set of multiple messages via a user interface of the user device in accordance with the ranking.

An apparatus for automatically ranking messages for a group-based communication system is described. The apparatus may include a processor, memory coupled with the processor, and instructions stored in the memory. The instructions may be executable by the processor to cause the apparatus to generate multiple sets of features corresponding to a set of multiple messages associated with a user view for the group-based communication system, a set of features of the multiple sets of features corresponding to a respective message of the set of multiple messages, and the user view associated with a user of the group-based communication system. The instructions may be further executable by the processor to cause the apparatus to input the multiple sets of features into a machine learning model trained to rank the set of multiple messages for the user view, determine, in response to the inputting the multiple sets of features into the machine learning model, an output of the machine learning model indicating a ranking of the set of multiple messages for the user view; and send, to a user device operated by the user and displaying the user view, an indication of the ranking of the set of multiple messages for rendering the set of multiple messages via a user interface of the user device in accordance with the ranking.

Another apparatus for automatically ranking messages for a group-based communication system is described. The apparatus may include means for generating multiple sets of features corresponding to a set of multiple messages associated with a user view for the group-based communication system, a set of features of the multiple sets of features corresponding to a respective message of the set of multiple messages, and the user view associated with a user of the group-based communication system. The apparatus may further include means for inputting the multiple sets of features into a machine learning model trained to rank the set of multiple messages for the user view, means for determining, in response to the inputting the multiple sets of features into the machine learning model, an output of the machine learning model indicating a ranking of the set of multiple messages for the user view, and means for sending, to a user device operated by the user and displaying the user view; an indication of the ranking of the set of multiple messages for rendering the set of multiple messages via a user interface of the user device in accordance with the ranking.

A non-transitory computer-readable medium storing code for automatically ranking messages for a group-based communication system is described. The code may include instructions executable by a processor to generate multiple sets of features corresponding to a set of multiple messages associated with a user view for the group-based communication system, a set of features of the multiple sets of features corresponding to a respective message of the set of multiple messages, and the user view associated with a user of the group-based communication system. The code may further include instructions executable by a processor to input the multiple sets of features into a machine learning model trained to rank the set of multiple messages for the user view, determine, in response to the inputting the multiple sets of features into the machine learning model, an output of the machine learning model indicating a ranking of the set of multiple messages for the user view; and send, to a user device operated by the user and displaying the user view, an indication of the ranking of the set of multiple messages for rendering the set of multiple messages via a user interface of the user device in accordance with the ranking.

Some examples of the method, apparatuses, and non-transitory computer-readable medium described herein may further include operations, features, means, or instructions for receiving, via the user interface of the user device, a first input indicating a first selection to order the set of multiple messages associated with the user view according to a predictive ranking, where the indication of the ranking of the set of multiple messages may be sent based on the first input.

Some examples of the method, apparatuses, and non-transitory computer-readable medium described herein may further include operations, features, means, or instructions for receiving, via the user interface of the user device, a second input indicating a second selection to order the set of multiple messages associated with the user view according to a timestamp order or a filename order and sending, to the user device operated by the user and displaying the user view, an indication of an order of the set of multiple messages for rendering the set of multiple messages via the user interface of the user device in accordance with the order based on the second input.

Some examples of the method, apparatuses, and non-transitory computer-readable medium described herein may further include operations, features, means, or instructions for receiving a new message to add to the user view for the group-based communication system, generating a new set of features corresponding to the new message, inputting the multiple sets of features and the new set of features into the machine learning model, and determining, in response to the inputting the multiple sets of features and the new set of features into the machine learning model, a second output of the machine learning model indicating a second ranking of the set of multiple messages and the new message for the user view.

Some other examples of the method, apparatuses, and non-transitory computer-readable medium described herein may further include operations, features, means, or instructions for receiving a new message to add to the user view for the group-based communication system, generating a new set of features corresponding to the new message, inputting the new set of features into the machine learning model, and determining, in response to the inputting the new set of features into the machine learning model, a second ranking of the set of multiple messages and the new message for the user view based on a second output of the machine learning model indicating a rank position for the new message relative to the set of multiple messages for the user view.

Some examples of the method, apparatuses, and non-transitory computer-readable medium described herein may further include operations, features, means, or instructions for receiving interaction data for the set of multiple messages associated with the user view and corresponding to the user and updating the machine learning model based on the interaction data.

Some examples of the method, apparatuses, and non-transitory computer-readable medium described herein may further include operations, features, means, or instructions for receiving, via the user interface of the user device, an input reordering the set of multiple messages in the user view for the user and updating the machine learning model based on the reordering of the set of multiple messages in the user view for the user.

In some examples of the method, apparatuses, and non-transitory computer-readable medium described herein, the user view corresponds to a first view of messages saved for later by the user, a second view of draft messages for the user, a third view of updated threads associated with the user in the group-based communication system, a fourth view of files stored for the user in the group-based communication system, or any combination thereof.

In some examples of the method, apparatuses, and non-transitory computer-readable medium described herein, a set of multiple machine learning models may be trained to rank messages for a set of multiple user views.

In some examples of the method, apparatuses, and non-transitory computer-readable medium described herein, the set of features includes a first graphical embedding for the user, a second graphical embedding for the user view, contents of the respective message, first interaction data for the user with the user view, second interaction data for a set of multiple other users with the respective message, historical data for the user, or any combination thereof.

In some examples of the method, apparatuses, and non-transitory computer-readable medium described herein, the machine learning model includes a gradient-boosted tree model.

The following provides an overview of aspects of the present disclosure:

Aspect 1: A method for automatically marking messages in a group-based communication system for later, comprising: receiving a new message posted to a group-based communication channel of the group-based communication system, wherein a first user is associated with the group-based communication channel and a second user authored the new message: inputting one or more features associated with the new message, the group-based communication channel, the first user, the second user, or a combination thereof into a machine learning model, the one or more features comprising at least a semantic embedding of the new message: determining, in response to the inputting the one or more features into the machine learning model, an output of the machine learning model indicating to mark the new message for later for the first user; and sending, for display in a user interface of a user device operated by the first user, an indication marking the new message for later based at least in part on the output of the machine learning model.

Aspect 2: The method of aspect 1, wherein sending the indication marking the new message for later comprises: sending, for display in the user interface of the user device, a suggestion to mark the new message for later: receiving, via the user interface of the user device, an input approving the suggestion; and adding the new message to a plurality of messages marked for later for the first user in response to the input approving the suggestion.

Aspect 3: The method of aspect 2, further comprising: updating the machine learning model based at least in part on the input approving the suggestion.

Aspect 4: The method of aspect 1, further comprising: sending, for display in the user interface of the user device, a suggestion to mark the new message for later: receiving, via the user interface of the user device, an input declining the suggestion; and refraining from adding the new message to a plurality of messages marked for later for the first user in response to the input declining the suggestion.

Aspect 5: The method of aspect 4, further comprising: updating the machine learning model based at least in part on the input declining the suggestion.

Aspect 6: The method of any of aspects 1 through 5, wherein a third user is associated with the group-based communication channel, the method further comprising: inputting one or more second features associated with the new message, the group-based communication channel, the third user, the second user, or a combination thereof into the machine learning model, the one or more second features comprising at least the semantic embedding of the new message; and determining, in response to the inputting the one or more second features into the machine learning model, a second output of the machine learning model indicating not to mark the new message for later for the third user.

Aspect 7: The method of any of aspects 1 through 6, further comprising: receiving, via a sidebar of the user interface of the user device, an input indicating selection of a later tab for the group-based communication system; and sending, for display in a main pane of the user interface of the user device and in response to the input, a plurality of messages marked for later for the first user, the plurality of messages marked for later comprising at least the new message.

Aspect 8: The method of any of aspects 1 through 7, further comprising: generating a feature of the one or more features indicating that the new message comprises text corresponding to a date, a time, or both, wherein the output of the machine learning model indicating to mark the new message for later for the first user is based at least in part on the new message comprising the text corresponding to the date, the time, or both.

Aspect 9: The method of aspect 8, further comprising: automatically creating a reminder for the first user in the group-based communication system based at least in part on the new message comprising the text corresponding to the date, the time, or both, wherein a trigger time for the reminder is based at least in part on the date, the time, or both.

Aspect 10: The method of any of aspects 1 through 9, wherein the machine learning model is trained based at least in part on: first data that includes prior messages marked for later by a plurality of users; and second data that includes text data, user data, channel data, or any combination thereof associated with the prior messages marked for later, to learn relationships between the first and the second data, such that the machine learning model is trained to output an indication of whether to mark the new message for later upon input of the one or more features.

Aspect 11: The method of aspect 10, wherein the machine learning model corresponds to a first group of the group-based communication system, the first group comprising at least the first user and the second user; and a second machine learning model different from the machine learning model is trained, the second machine learning model corresponding to a second group of the group-based communication system, and the second machine learning model trained to output a second indication of whether to mark new messages for later for users of the second group.

Aspect 12: The method of any of aspects 1 through 11, further comprising: deploying the machine learning model for the group-based communication system; retrieving, from a plurality of messages associated with the first user in the group-based communication system, a first subset of the plurality of messages associated with the first user based at least in part on a filter criterion; and determining, based at least in part on the first subset of the plurality of messages associated with the first user and the machine learning model, a second subset of the first subset of the plurality of messages to mark for later for the first user.

Aspect 13: The method of any of aspects 1 through 12, wherein the one or more features further comprise a first graphical embedding for the first user, a second graphical embedding for the second user, a third graphical embedding for the group-based communication channel, contents of the new message, relationship data for the first user and the second user, first interaction data for the first user with the group-based communication channel, second interaction data for a plurality of other users with the new message, historical data for the first user, group structure information for a group associated with the group-based communication channel, or any combination thereof.

Aspect 14: A method for automatically ranking messages for a group-based communication system, comprising: generating a plurality of sets of features corresponding to a plurality of messages associated with a user view for the group-based communication system, a set of features of the plurality of sets of features corresponding to a respective message of the plurality of messages, and the user view associated with a user of the group-based communication system: inputting the plurality of sets of features into a machine learning model trained to rank the plurality of messages for the user view: determining, in response to the inputting the plurality of sets of features into the machine learning model, an output of the machine learning model indicating a ranking of the plurality of messages for the user view; and sending, to a user device operated by the user and displaying the user view, an indication of the ranking of the plurality of messages for rendering the plurality of messages via a user interface of the user device in accordance with the ranking.

Aspect 15: The method of aspect 14, further comprising: receiving, via the user interface of the user device, a first input indicating a first selection to order the plurality of messages associated with the user view according to a predictive ranking, wherein the indication of the ranking of the plurality of messages is sent based at least in part on the first input.

Aspect 16: The method of aspect 15, further comprising: receiving, via the user interface of the user device, a second input indicating a second selection to order the plurality of messages associated with the user view according to a timestamp order or a filename order; and sending, to the user device operated by the user and displaying the user view, an indication of an order of the plurality of messages for rendering the plurality of messages via the user interface of the user device in accordance with the order based at least in part on the second input.

Aspect 17: The method of any of aspects 14 through 16, further comprising: receiving a new message to add to the user view for the group-based communication system; generating a new set of features corresponding to the new message: inputting the plurality of sets of features and the new set of features into the machine learning model; and determining, in response to the inputting the plurality of sets of features and the new set of features into the machine learning model, a second output of the machine learning model indicating a second ranking of the plurality of messages and the new message for the user view.

Aspect 18: The method of any of aspects 14 through 16, further comprising: receiving a new message to add to the user view for the group-based communication system; generating a new set of features corresponding to the new message: inputting the new set of features into the machine learning model; and determining, in response to the inputting the new set of features into the machine learning model, a second ranking of the plurality of messages and the new message for the user view based at least in part on a second output of the machine learning model indicating a rank position for the new message relative to the plurality of messages for the user view.

Aspect 19: The method of any of aspects 14 through 18, further comprising: receiving interaction data for the plurality of messages associated with the user view and corresponding to the user; and updating the machine learning model based at least in part on the interaction data.

Aspect 20: The method of any of aspects 14 through 19, further comprising: receiving, via the user interface of the user device, an input reordering the plurality of messages in the user view for the user; and updating the machine learning model based at least in part on the reordering of the plurality of messages in the user view for the user.

Aspect 21: The method of any of aspects 14 through 20, wherein the user view corresponds to a first view of messages saved for later by the user, a second view of draft messages for the user, a third view of updated threads associated with the user in the group-based communication system, a fourth view of files stored for the user in the group-based communication system, or any combination thereof.

Aspect 22: The method of any of aspects 14 through 21, wherein a plurality of machine learning models is trained to rank messages for a plurality of user views.

Aspect 23: The method of any of aspects 14 through 22, wherein the set of features comprises a first graphical embedding for the user, a second graphical embedding for the user view, contents of the respective message, first interaction data for the user with the user view, second interaction data for a plurality of other users with the respective message, historical data for the user, or any combination thereof.

Aspect 24: The method of any of aspects 14 through 23, wherein the machine learning model comprises a gradient-boosted tree model.

Aspect 25: An apparatus for automatically marking messages in a group-based communication system for later, comprising a processor; memory coupled with the processor; and instructions stored in the memory and executable by the processor to cause the apparatus to perform a method of any of aspects 1 through 13.

Aspect 26: An apparatus for automatically marking messages in a group-based communication system for later, comprising at least one means for performing a method of any of aspects 1 through 13.

Aspect 27: A non-transitory computer-readable medium storing code for automatically marking messages in a group-based communication system for later, the code comprising instructions executable by a processor to perform a method of any of aspects 1 through 13.

Aspect 28: An apparatus for automatically ranking messages for a group-based communication system, comprising a processor; memory coupled with the processor; and instructions stored in the memory and executable by the processor to cause the apparatus to perform a method of any of aspects 14 through 24.

Aspect 29: An apparatus for automatically ranking messages for a group-based communication system, comprising at least one means for performing a method of any of aspects 14 through 24.

Aspect 30: A non-transitory computer-readable medium storing code for automatically ranking messages for a group-based communication system, the code comprising instructions executable by a processor to perform a method of any of aspects 14 through 24.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for automatically marking messages in a group-based communication system for later, comprising:

receiving a new message posted to a group-based communication channel of the group-based communication system, wherein a first user is associated with the group-based communication channel and a second user authored the new message;

inputting one or more features associated with the new message, the group-based communication channel, the first user, the second user, or a combination thereof into a machine learning model, the one or more features comprising at least a semantic embedding of the new message;

determining, in response to the inputting the one or more features into the machine learning model, an output of the machine learning model indicating to mark the new message for later for the first user; and sending, for display in a user interface of a user device operated by the first user, an indication marking the new message for later based at least in part on the output of the machine learning model.

2. The method of claim 1, wherein sending the indication marking the new message for later comprises:

sending, for display in the user interface of the user device, a suggestion to mark the new message for later;

receiving, via the user interface of the user device, an input approving the suggestion; and adding the new message to a plurality of messages marked for later for the first user in response to the input approving the suggestion.

3. The method of claim 2, further comprising:

updating the machine learning model based at least in part on the input approving the suggestion.

4. The method of claim 1, further comprising:

sending, for display in the user interface of the user device, a suggestion to mark the new message for later;

receiving, via the user interface of the user device, an input declining the suggestion; and refraining from adding the new message to a plurality of messages marked for later for the first user in response to the input declining the suggestion.

5. The method of claim 4, further comprising:

updating the machine learning model based at least in part on the input declining the suggestion.

6. The method of claim 1, wherein a third user is associated with the group-based communication channel, the method further comprising:

inputting one or more second features associated with the new message, the group-based communication channel, the third user, the second user, or a combination thereof into the machine learning model, the one or more second features comprising at least the semantic embedding of the new message; and determining, in response to the inputting the one or more second features into the machine learning model, a second output of the machine learning model indicating not to mark the new message for later for the third user.

7. The method of claim 1, further comprising:

receiving, via a sidebar of the user interface of the user device, an input indicating selection of a later tab for the group-based communication system; and sending, for display in a main pane of the user interface of the user device and in response to the input, a plurality of messages marked for later for the first user, the plurality of messages marked for later comprising at least the new message.

8. The method of claim 1, further comprising:

generating a feature of the one or more features indicating that the new message comprises text corresponding to a date, a time, or both, wherein the output of the machine learning model indicating to mark the new message for later for the first user is based at least in part on the new message comprising the text corresponding to the date, the time, or both.

9. The method of claim 8, further comprising:

automatically creating a reminder for the first user in the group-based communication system based at least in part on the new message comprising the text corresponding to the date, the time, or both, wherein a trigger time for the reminder is based at least in part on the date, the time, or both.

10. The method of claim 1, wherein the machine learning model is trained based at least in part on:

first data that includes prior messages marked for later by a plurality of users; and second data that includes text data, user data, channel data, or any combination thereof associated with the prior messages marked for later, to learn relationships between the first data and the second data, such that the machine learning model is trained to output an indication of whether to mark the new message for later upon input of the one or more features.

11. The method of claim 10, wherein:

the machine learning model corresponds to a first group of the group-based communication system, the first group comprising at least the first user and the second user; and a second machine learning model different from the machine learning model is trained, the second machine learning model corresponding to a second group of the group-based communication system, and the second machine learning model trained to output a second indication of whether to mark new messages for later for users of the second group.

12. The method of claim 1, further comprising:

deploying the machine learning model for the group-based communication system;

retrieving, from a plurality of messages associated with the first user in the group-based communication system, a first subset of the plurality of messages associated with the first user based at least in part on a filter criterion; and determining, based at least in part on the first subset of the plurality of messages associated with the first user and the machine learning model, a second subset of the first subset of the plurality of messages to mark for later for the first user.

13. The method of claim 1, wherein the one or more features further comprise a first graphical embedding for the first user, a second graphical embedding for the second user, a third graphical embedding for the group-based communication channel, contents of the new message, relationship data for the first user and the second user, first interaction data for the first user with the group-based communication channel, second interaction data for a plurality of other users with the new message, historical data for the first user, group structure information for a group associated with the group-based communication channel, or any combination thereof.

14. An apparatus for automatically marking messages in a group-based communication system for later, comprising:

a processor;

memory coupled with the processor; and instructions stored in the memory and executable by the processor to cause the apparatus to:

receive a new message posted to a group-based communication channel of the group-based communication system, wherein a first user is associated with the group-based communication channel and a second user authored the new message;

input one or more features associated with the new message, the group-based communication channel, the first user, the second user, or a combination thereof into a machine learning model, the one or more features comprising at least a semantic embedding of the new message;

determine, in response to the inputting the one or more features into the machine learning model, an output of the machine learning model indicating to mark the new message for later for the first user; and send, for display in a user interface of a user device operated by the first user, an indication marking the new message for later based at least in part on the output of the machine learning model.

15. The apparatus of claim 14, wherein the instructions to send the indication marking the new message for later are executable by the processor to cause the apparatus to:

> send, for display in the user interface of the user device, a suggestion to mark the new message for later;
>
> receive, via the user interface of the user device, an input approving the suggestion; and
>
> add the new message to a plurality of messages marked for later for the first user in response to the input approving the suggestion.

16. The apparatus of claim 14, wherein the instructions are further executable by the processor to cause the apparatus to:

> send, for display in the user interface of the user device, a suggestion to mark the new message for later;
>
> receive, via the user interface of the user device, an input declining the suggestion; and
>
> refrain from adding the new message to a plurality of messages marked for later for the first user in response to the input declining the suggestion.

17. The apparatus of claim 14, wherein a third user is associated with the group-based communication channel, and the instructions are further executable by the processor to cause the apparatus to:

> input one or more second features associated with the new message, the group-based communication channel, the third user, the second user, or a combination thereof into the machine learning model, the one or more second features comprising at least the semantic embedding of the new message; and
>
> determine, in response to the inputting the one or more second features into the machine learning model, a second output of the machine learning model indicating not to mark the new message for later for the third user.

18. The apparatus of claim 14, wherein the instructions are further executable by the processor to cause the apparatus to:

> generate a feature of the one or more features indicating that the new message comprises text corresponding to a date, a time, or both, wherein the output of the > machine learning model indicating to mark the new message for later for the first user is based at least in part on the new message comprising the text corresponding to the date, the time, or both.

19. The apparatus of claim 18, wherein the instructions are further executable by the processor to cause the apparatus to:

> automatically create a reminder for the first user in the group-based communication system based at least in part on the new message comprising the text corresponding to the date, the time, or both, wherein a trigger time for the reminder is based at least in part on the date, the time, or both.

20. A non-transitory computer-readable medium storing code for automatically marking messages in a group-based communication system for later, the code comprising instructions executable by a processor to:

> receive a new message posted to a group-based communication channel of the group-based communication system, wherein a first user is associated with the group-based communication channel and a second user authored the new message;
>
> input one or more features associated with the new message, the group-based communication channel, the first user, the second user, or a combination thereof into a machine learning model, the one or more features comprising at least a semantic embedding of the new message;
>
> determine, in response to the inputting the one or more features into the machine learning model, an output of the machine learning model indicating to mark the new message for later for the first user; and
>
> send, for display in a user interface of a user device operated by the first user, an indication marking the new message for later based at least in part on the output of the machine learning model.

* * * * *